United States Patent [19]
Blair et al.

[11] Patent Number: 5,621,398
[45] Date of Patent: Apr. 15, 1997

[54] PROGRAMMABLE SWITCH

[75] Inventors: James F. L. Blair, St. Charles; Frank C. Alterio, Arlington Heights, both of Ill.

[73] Assignee: Saint Switch, Inc., St. Charles, Ill.

[21] Appl. No.: 512,090

[22] Filed: Aug. 7, 1995

[51] Int. Cl.$^6$ .................................................. G08C 19/06
[52] U.S. Cl. ........................ 340/870.36; 340/870.16; 340/870.04; 340/686
[58] Field of Search ...................... 340/870.01, 870.04, 340/870.05, 870.07, 870.09, 870.16, 870.36, 686; 364/474.28, 474.35

[56] References Cited

U.S. PATENT DOCUMENTS

| | | | |
|---|---|---|---|
| 4,140,998 | 2/1979 | Bettle | 340/870.36 |
| 4,456,038 | 6/1984 | Gwaltney et al. | 340/626 |
| 4,783,659 | 11/1988 | Frick | 340/870.04 |
| 4,849,754 | 7/1989 | Maltby et al. | 340/870.16 |
| 4,982,106 | 1/1991 | Castellanet et al. | 340/686 |
| 5,235,274 | 8/1993 | Frazzini et al. | 340/870.36 |

*Primary Examiner*—Jeffery Hofsass
*Assistant Examiner*—Andrew Hill
*Attorney, Agent, or Firm*—Wood, Phillips, VanSanten, Clark & Mortimer

[57] ABSTRACT

A programmable switch includes a housing. A sensor is associated with the housing. The sensor senses a measurable physical property of a sensed element proximate the housing and developing an electrical signal varying relative thereto to represent the sensed physical property. A logic circuit is disposed in the housing and receives the electrical signal. The logic circuit includes a memory for storing a reference value and a controller for comparing the reference value to the sensed physical property to determine status of the sensed physical property. An input circuit is operatively associated with the logic circuit for selectively changing the stored reference value to reprogram the switch. An output switch is operatively associated with the logic circuit to externally indicate status of the sensed property.

19 Claims, 25 Drawing Sheets

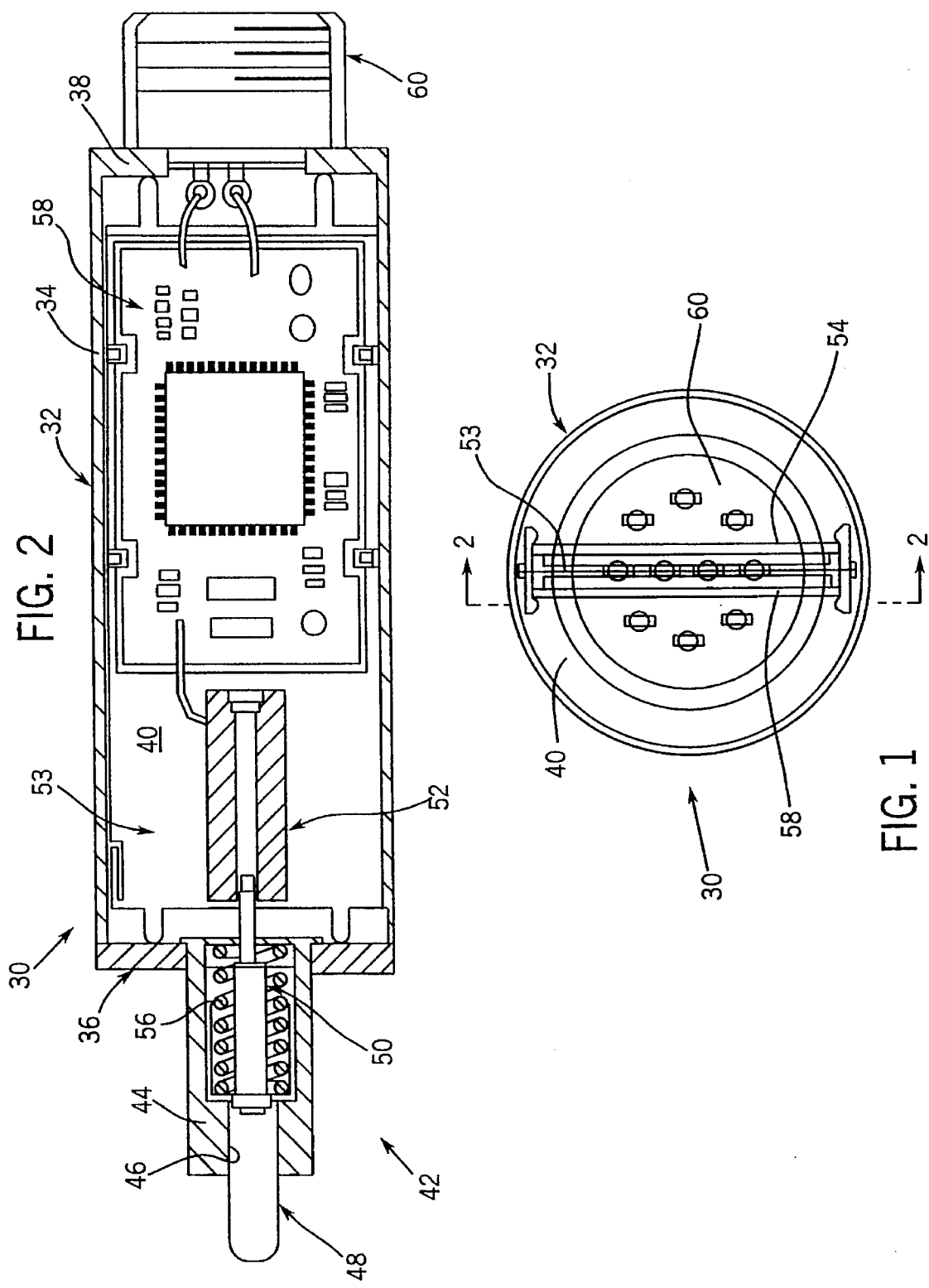

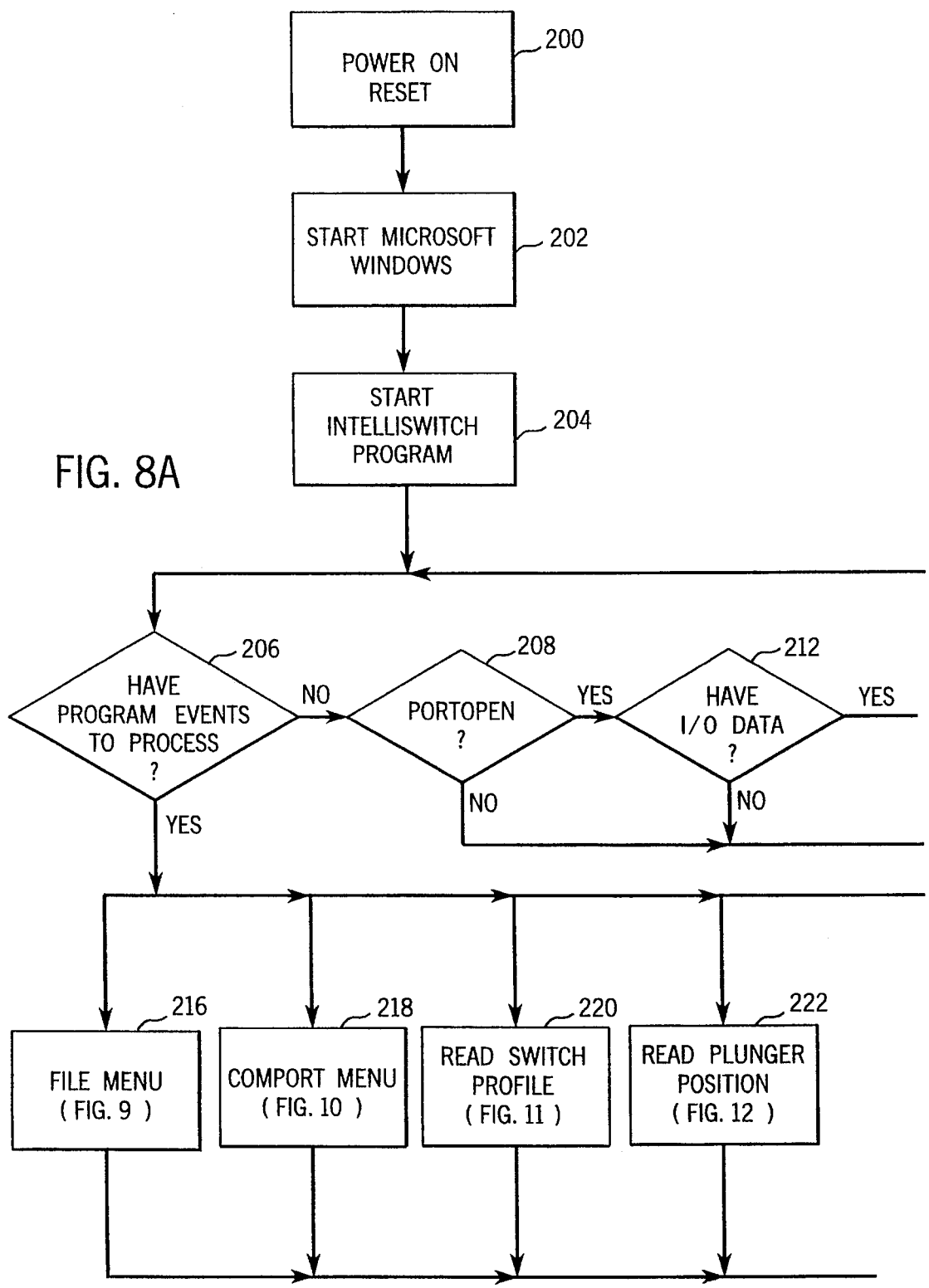

PROGRAMMABLE SWITCH

FIELD OF THE INVENTION

This invention generally relates to electrical switches and, more particularly, to electrical switches having programmable set points.

BACKGROUND OF THE INVENTION

Electrical switches are frequently employed in sensing or interlock circuits. These switches are usually of relatively small size and include a movable actuator, or plunger, disposed in the path of a movable object. When the switch actuator is contacted by the object, the switch condition changes, i.e., from open to closed or from closed to open. The change in condition is sensed to provide an indication or to cause some further operation to occur.

In the usual case, much care must be taken to properly adjust the location of the switch body with relation to the path of movement of the object to be sensed. In some conditions, the consequences of maladjustment, either due to poor initial adjustment or to loss of adjustment during operation, can be extreme. For example, switches of this sort are employed in military vehicles and airlines for a variety of purposes. These applications require that the switch be precisely mounted and mechanically adjusted to provide the proper set point during initial installment. During subsequent use, environmental conditions might cause loss of adjustment. With a typical switch readjustment required returning to the site of the switch to mechanically readjust the position. Depending on the location, this might be a very difficult operation and require extended down time.

In some applications it is desirable to sense multiple discrete conditions of the movable object. With prior switches this requires that a separate switch be provided for each position. Each must be separately adjusted and readjusted to satisfy operational requirements.

While the problems discussed above are particularly apparent relative to sensing applications, such as a limit switch, the problems also exist in other applications, such as use of non-contact proximity sensors, pressure transducers and the like.

The present invention is directed to overcoming one or more of the problems discussed above in a novel and simple manner.

SUMMARY OF THE INVENTION

In accordance with the invention a programmable switch is provided that permits a switch set point to be easily changed.

It is another object of the invention to provide a switch including multiple outputs each including a separate set point.

Broadly, there is disclosed herein a programmable switch including a housing. A sensor is associated with the housing. The sensor includes means for sensing a measurable physical property of a sensed element proximate the housing and developing an electrical signal varying relative thereto to represent the sensed physical property. A logic circuit is disposed in the housing and receives the electrical signal. The logic circuit includes storage means for storing a reference value and logic means for comparing the reference value to the sensed physical property to determine status of the sensed physical property. Input means are operatively associated with the logic circuit for selectively changing the stored reference value to reprogram the switch. Output switch means are operatively associated with the logic circuit to externally indicate status of the sensed property.

In an exemplary embodiment the sensor comprises an actuator movable relative to the housing for determining position of the sensed element. The sensor includes a linear variable differential transducer (LVDT) for sensing position of the actuator. A signal conditioner circuit drives the LVDT and develops the electrical signal. A logic circuit comprises a microcontroller in the housing receiving the electrical signal. The reference value is stored in the microcontroller memory. A serial interface circuit is connected to the microcontroller for connection to an external programming device capable of downloading the reference value to the microcontroller. An electronic switch is connected to the microcontroller for connection to external devices.

In accordance with a further aspect of the invention the microcontroller stores a plurality of reference values. The microcontroller compares the sensed value to each of the reference values and develops a plurality of outputs to indicate a plurality of discrete conditions of the sensed physical property.

In accordance with another aspect of the invention, each of the stored reference values comprises a set point and a reset point to provide hysteresis.

The programming device may consist of a conventional personal computer programmed to communication with the switch through a conventional serial port. Alternatively, the programming device may comprise a stand alone programmer likewise capable of communicating with the programmable switch.

Further features and advantages of the invention will be readily apparent from the specification and from the drawings.

BRIEF DESCRIPTION OF THE DRAWINGS

FIG. 1 is an end view of a programmable switch according to the invention;

FIG. 2 is a sectional view taken along the line 2—2 of FIG. 1;

FIGS. 8A, 8B, 8C and 8D comprise an overview flow chart of a program used for programming the programmable switch;

DETAILED DESCRIPTION OF THE INVENTION

Figure 3:
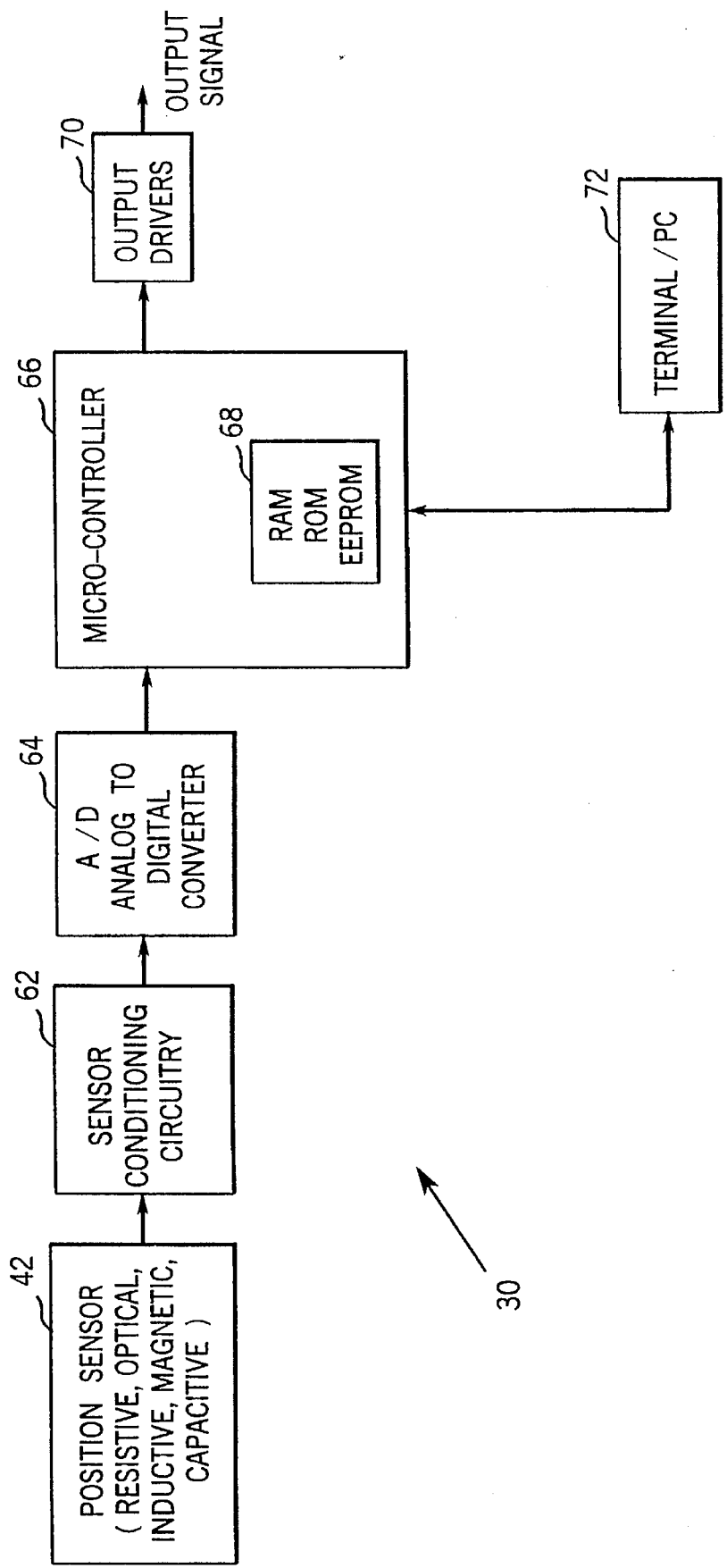
FIG. 3 is a block diagram of the programmable switch.

Referring to FIGS. 1 and 2, a programmable switch 30 according to the invention is illustrated. The programmable switch 30 is adapted to compare a sensed physical property to a stored reference value to control the state of an output. Further, the programmable switch may compare the sensed physical property to plural reference values to provide multiple outputs.

The switch 30 includes a housing 32 having a cylindrical side wall 34 closed by opposite end walls 36 and 38 to define an interior space 40.

A sensor 42 is associated with the housing 32. The sensor 42 comprises a cylindrical head 44 extending from the end wall 36. An axial opening 46 slidably receives an actuator in the form of a plunger 48. The plunger 48 is linked to a core 50 of a linear variable differential transducer (LVDT) 52 mounted to a holder 53 in the space 40. A return spring 56 normally biases the plunger 48 outwardly, i.e., away from the end wall 36. Linear movement of the plunger 48 causes related movement of the core 50 which is sensed by the LVDT. The holder 53 supports a first circuit board 54 and a second circuit board 58 in parallel relationship in the space 40. The second circuit board 58 is electrically connected to a ten pin military connector 60.

Referring to FIG. 3, the programmable switch 30 is illustrated in block diagram form. The position sensor 42 is operable to sense a measurable physical property. In the embodiment illustrated in FIG. 1, the physical property is position of a sensed element. While the position sensor includes an LVDT, the position sensor might form any conventional type of position sensor, such as resistive, optical, inductive, magnetic or capacitive, capable of sensing a measurable physical property of a sensed element proximate the housing 32 and developing an electrical signal varying relative thereto to represent the sensed physical property.

The position sensor 42 is electrically connected to sensor conditioning circuitry 62 which develops an output voltage proportional to the sensed physical property. This voltage is then converted in an analog to digital (A/D) converter 64 for use by a microcomputer 66. The microcomputer 66 may comprise a microcontroller including suitable on-board memory 68, such as RAM, ROM and/or EEPROM. The microcontroller 66 receives the digitized electrical signal. A reference value is stored in the memory 68. The microcontroller 66 compares the stored reference value to the sensed physical property to determine status of the sensed physical property. The microcontroller 66 then develops a binary output signal dependent on sensor position and the programmed reference value to control an output signal via output drivers 70. The output signal is used to indicate the physical property or cause some other effect, in a conventional manner. The microcontroller 66 is adapted to be programmed via a serial interface from a programming terminal, such as a PC terminal 72.

Figure 4:
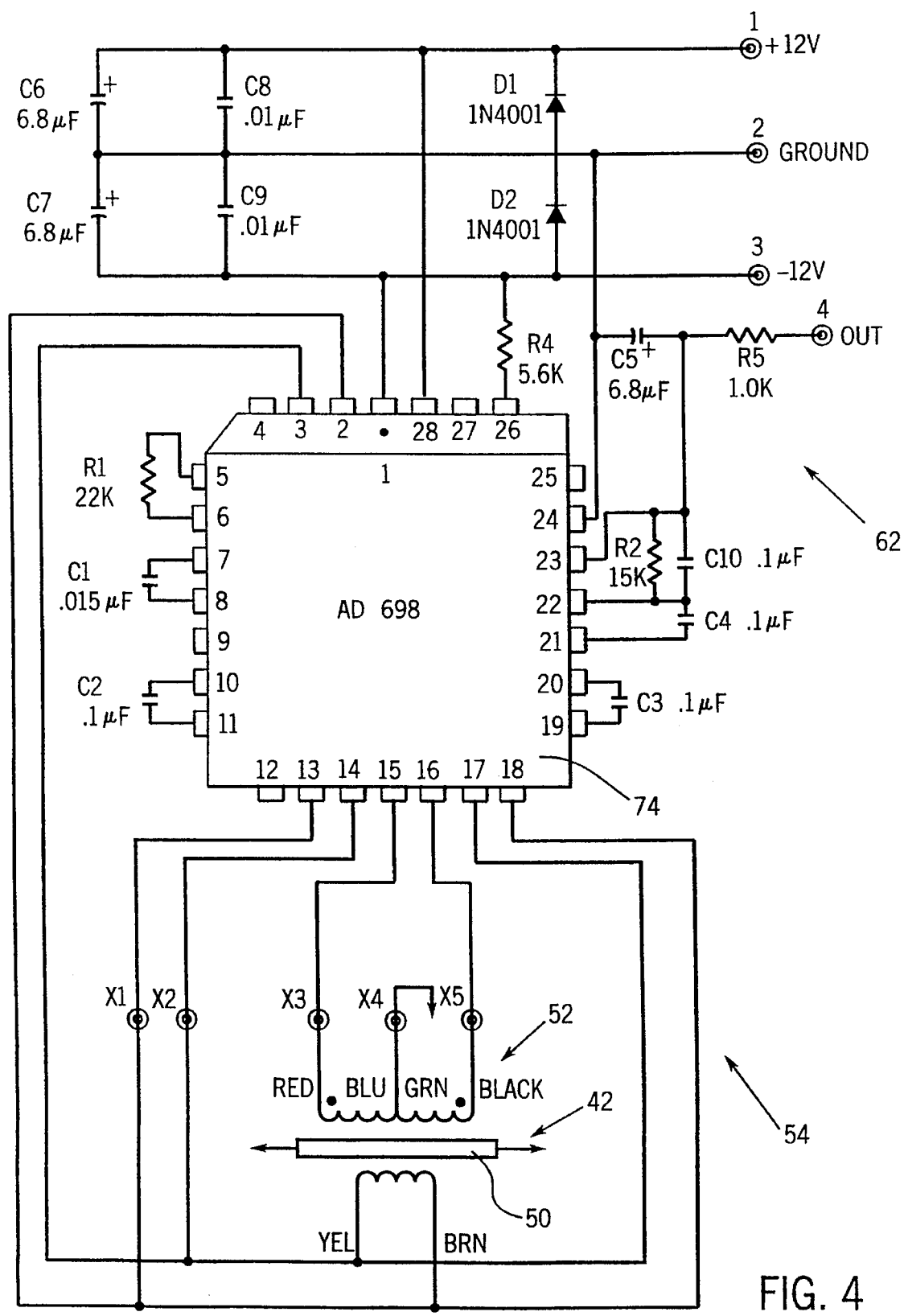
FIG. 4 is an electrical schematic of a first circuit board of the programmable switch.

Referring to FIG. 4, the position sensor 42 and sensor conditioning circuitry 62 are illustrated schematically. The LVDT is illustrated generally at 52 and shown relative to the movable core 50. The LVDT 52 is an electromechanical transducer which develops an AC voltage proportional to position of the core 50. The sensor conditioning circuitry 62 comprises a type AD698 universal LVDT signal conditioner 74 such as is manufactured by Analog Devices. The signal conditioner 74 converts the raw LVDT output to a scaled DC signal. The various circuit components illustrated in FIG. 4 are included on the first circuit board 54 of FIG. 2.

Figure 5:
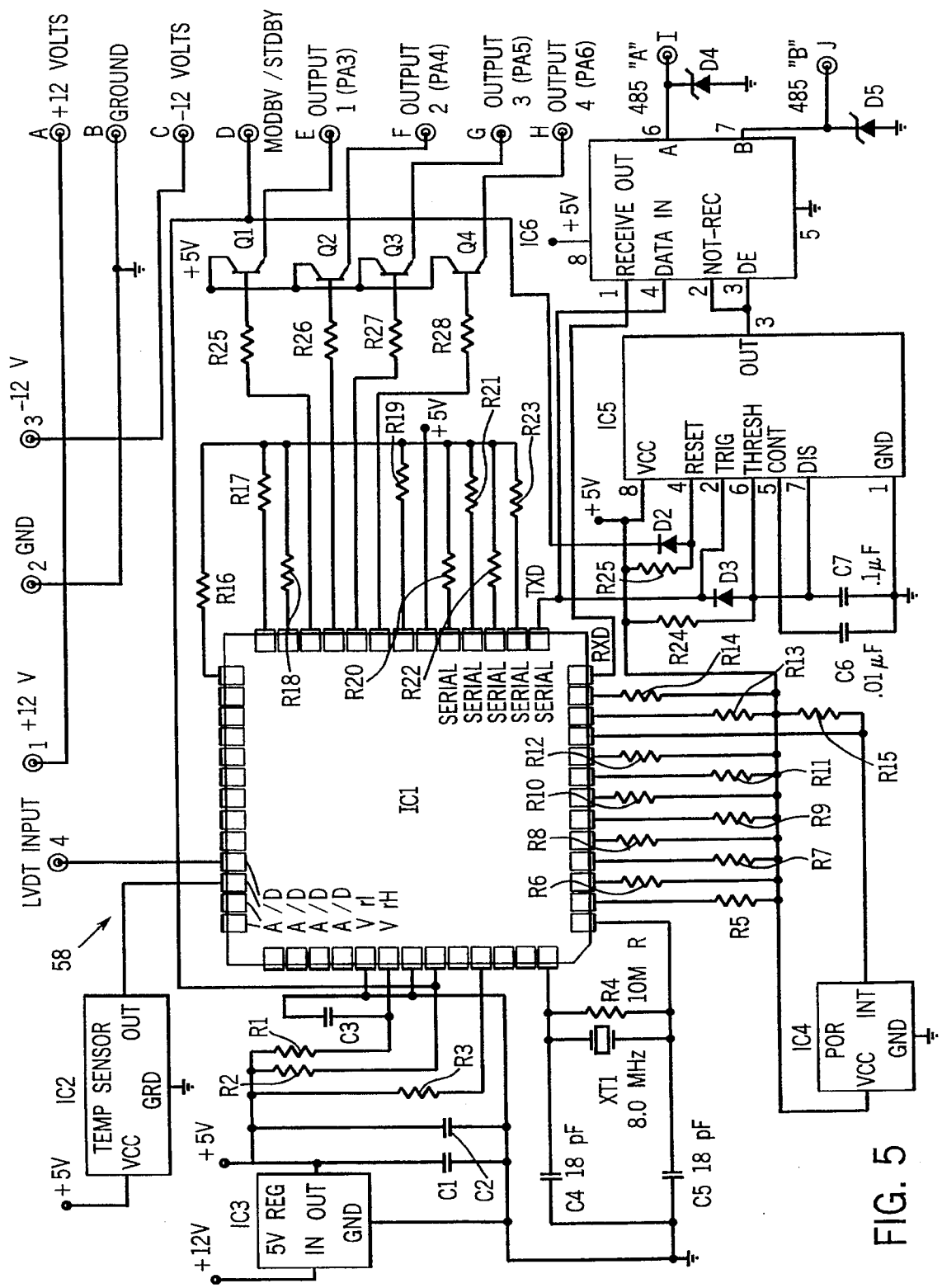
FIG. 5 is an electrical schematic of a second circuit board for the programmable switch.

Referring to FIG. 5, an electrical schematic illustrates a circuit included on the second circuit board 58 of FIG. 2. This circuit includes terminals A, B, C, D, E, F, G, H, I and J, forming the ten terminals of the connector 60 of FIGS. 1 and 2. The terminals A–J provide connection to external devices, as described below. The schematic also includes terminals 1, 2, 3 and 4 for connection to the first circuit board 54 for supplying voltage and receiving the output from the signal conditioner 74 of FIG. 4.

In the illustrated embodiment of the invention, the microcontroller 66 of FIG. 3 is provided in the form of a type HC11 microcontroller IC1. The microcontroller IC1 includes its own A/D converter receiving as an input the output from the LVDT signal conditioner 74. The microcontroller IC1 is operated in accordance with a control program, discussed below, to compare the LVDT input to a plurality of stored reference values to thus operate as a programmable switch.

Also connected to the microcontroller IC1 is a temperature sensor IC2 which develops a DC voltage proportional to temperature in the housing 32. A voltage regulator circuit IC3 develops regulated five volt power for operating the microcontroller IC1. A power on reset circuit IC4 provides a trigger to reset the microcontroller IC1 in a conventional manner. Serial communication between the microcontroller IC1 and a remote programmer is implemented using an RS485 interface chip IC6 and a 555 timer circuit IC5 which controls the interface chip IC6 to switch between sending and receiving of data.

The terminals labeled A, B and C receive power for operating the switch 30. The microcontroller IC1 is connected to common collector transistors Q1–Q4 to provide four output channels to the terminals E, F, G and H. The RS485 interface chip IC6 is connected to the terminals I and J.

As illustrated in FIG. 2, the position sensor 42 consists of a movable plunger 48 that moves relative to the housing 32. The position of the plunger 48 relative to the housing 32 is sensed using the LVDT 52. The sensed position is then converted to an analog voltage and thereafter to a digital value representing a measure of the plunger position. The microcontroller IC1 uses this digital value and compares it against up to four stored reference values stored in an on-board, non-volatile memory. The reference values determine if any of the four output channels should be high or if they should be low for each digital value of the sensor position. Thus, the device is programmable based on the switch set point being determined by preprogrammed values.

Figure 6:
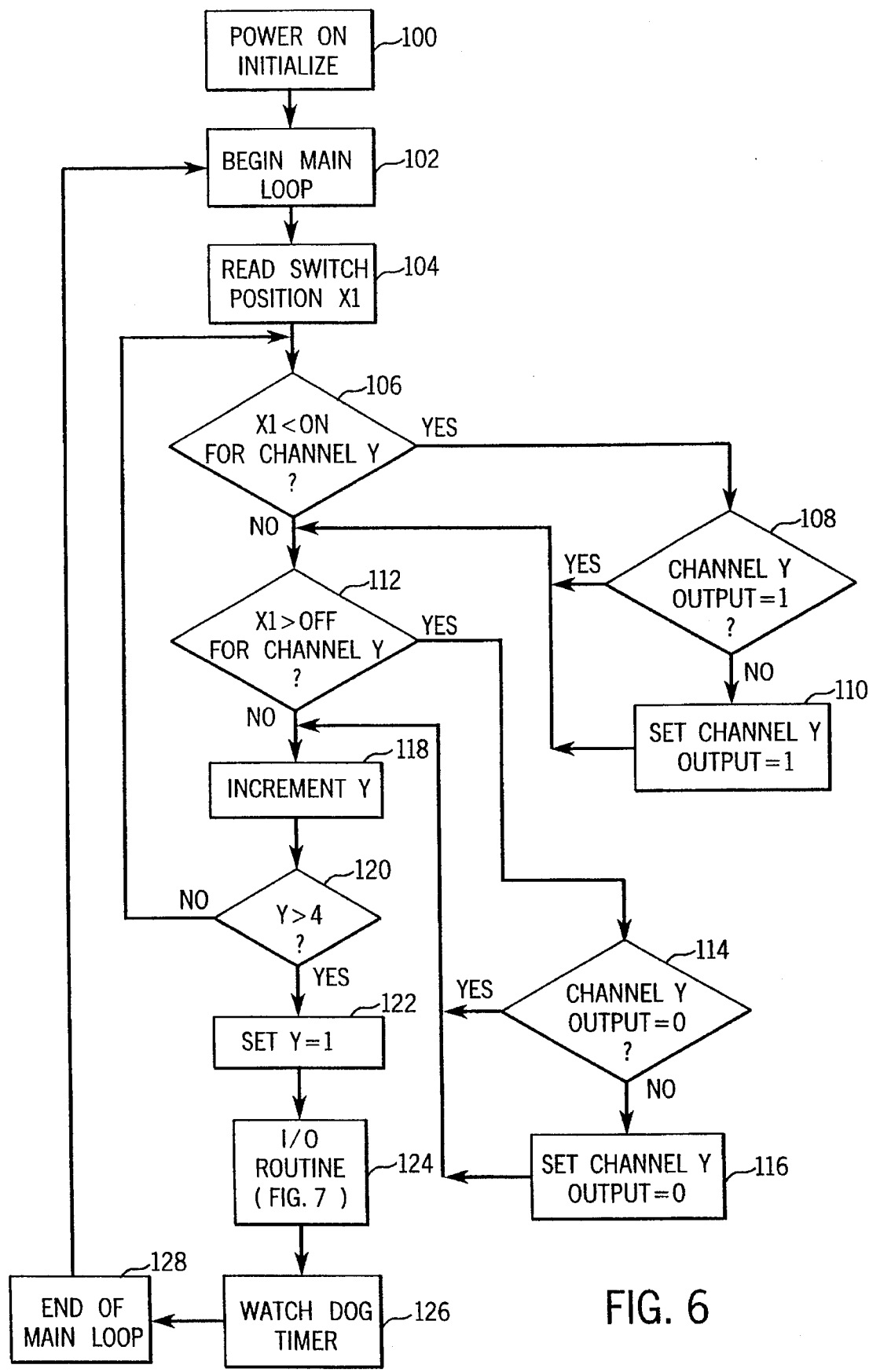
FIG. 6 is a flow diagram of a main operating program implemented by the microcontroller of FIG. 5.

Referring to FIG. 6, a flow diagram illustrates operation of a program stored in the memory 68 of the microcontroller 66, see FIG. 3, for operating the programmable switch 30. The program begins with a basic initialize routine at a block 100 when power is first supplied to the switch 30. A main loop then begins at a block 102. A switch position value X1 is read at a block 104. The switch position represents the position of the plunger 48 relative to the housing 32. This is determined based on the DC voltage supplied from the signal conditioner 74, see FIG. 4.

As discussed above, the microcontroller 66 is capable of storing reference values for up to four output channels. Each output channel can be programmed independently to control different functions. Also, each channel can be provided with a unique turn on and turn off value to provide hysteresis. The turn on value is referred to as a set point. The turn off value is referred to as a reset point. During initialization a value Y, representing one of the four channel numbers, is set to equal to one. A decision block 106 then determines if the switch position X1 is less than the stored set point value for channel Y. If so, indicating a switch on condition, then a decision block 108 determine if the channel Y output is already equal to one. If not, then the channel Y output is set equal to one at a block 110. Thereafter, or if the channel Y output is already equal to one, as determined at the decision block 108, then the program proceeds to a decision block 112 which determines if the switch position X1 is greater than a stored reset point value for channel Y. The off value could be the same as the on value. Alternatively, the off value could be greater to provide hysteresis and prevent cycling of the switch. If position is greater than the reset point value, then a decision block 114 determines if the channel Y output is already equal to zero. If not, then the channel Y output is set equal to zero at a block 116. Thereafter, or if the channel Y output was already equal to zero, then control proceeds to a block 118 to increment the value Y. A decision block 120 then determines if the Y value is greater than four. The value four is selected because there are four output channels. If not, then the routine returns to the decision block 106 to determine output status of the next channel. This loop is repeated until each of the four output channels have been updated. The program then proceeds to a block 122 to set the value Y back equal to one. An I/O routine is then performed at a block 124 followed by a watchdog timer routine at a block 126. The watchdog timer routine 126 ensures proper operation of the microcontroller IC1 in a conventional manner. The main loop then ends at a block 128 and returns to the block 102 to repeat the main loop.

Figure 7:
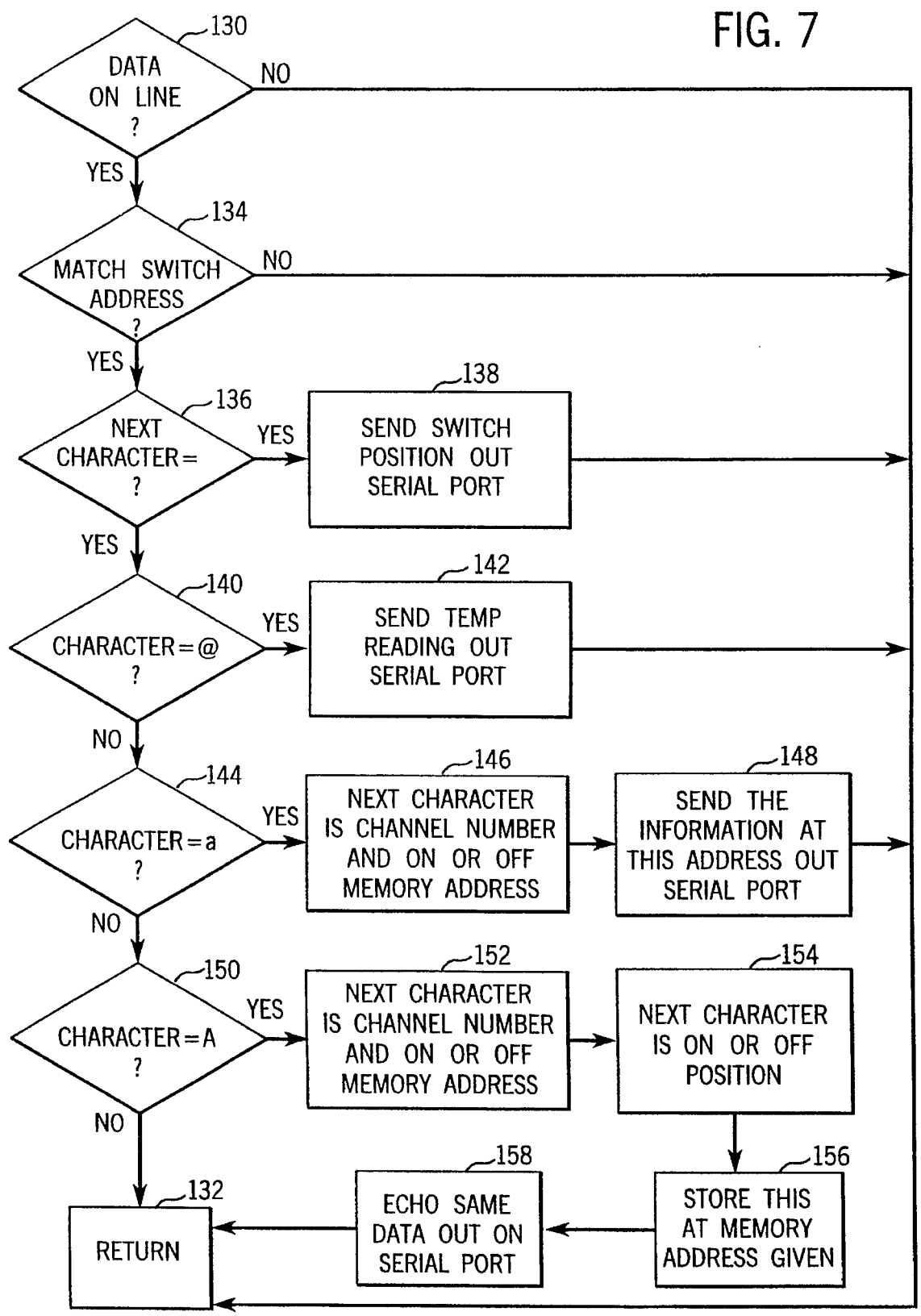
FIG. 7 is a flow diagram of an I/O routine.

Referring to FIG. 7, a flow diagram illustrates operation of the I/O routine called at the block 124 of FIG. 6. The I/O routine is used for communicating via the serial interface chip IC6, see FIG. 5, with a remote programmer 72, see FIG. 3.

A decision block 130 determines if there is any data on the line. If not, then the program proceeds to a block 132 to return to the main routine of FIG. 6. Data is present on the line only if the switch 30 is electrically connected to a programming device which has transmitted some command to the switch 30. If there is data on the line, then a decision block 134 determines if the address for the dam matches the address of the particular switch 30. The switch 30 uses an RS485 interface. The RS485 interface can be permanently connected to an RS485 bus with each interface having a distinct address. The decision block 134 determines if the data is for the address of the particular switch. If not, then the routine ends. If the switch address matches, then a decision block 136 determines if the next character is the "?" character. The "?" character represents a command used when the programming device wishes to receive the switch position X1. If so, then the switch position is sent out the serial port at a block 138 and the routine then ends. If the next character is not a "?", then a decision block 140 determines if the character is the "@" character. If so, then the temperature reading from the temperature sensor IC2 is sent out the serial port at a block 142 and the routine ends.

If the character is not the "@", as determined at the decision block 140, then a decision block 144 determines if the character is a "a" character. This character is used when the programmer desires to read the current set or reset point for a channel. If so, then the next character received at a block 146 will indicate the memory address for the channel number and the on or off reference value. The requested value for the indicated channel number is sent out the serial port at a block 148 and the routine ends. If the character is not the "a" character, as determined at the decision block 144, then a decision block 150 determines if the character is a "A" character. This character is used when the programmer desires to change the current set or reset point for a channel. If so, then the next character received at a block 152 will indicate the memory address for the channel number and the on or off reference value to be changed. The next character, received at a block 154, will be a value representing the new on or off position which is stored in memory at a block 156. The stored value is then echoed back out on the output port at a block 158 to verify that it was properly received and the routine ends.

Figure 22:
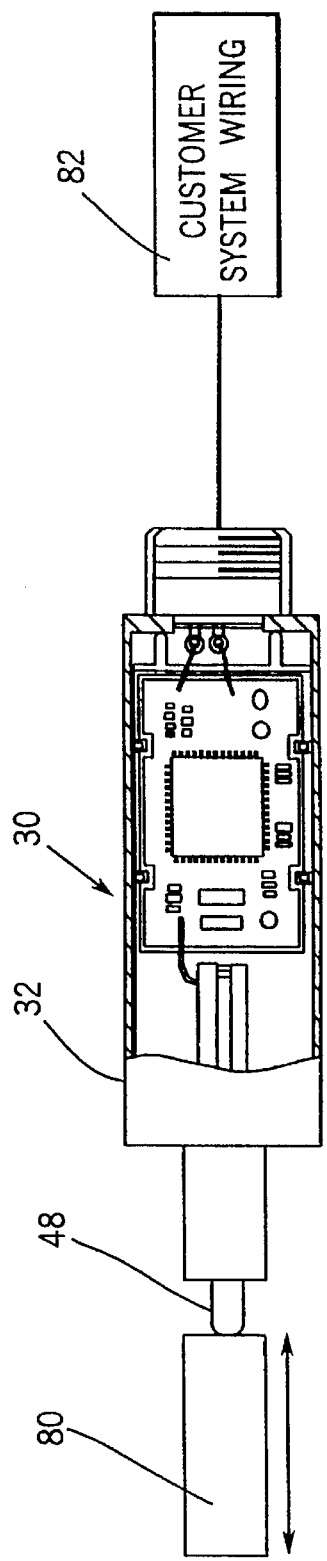
FIG. 22 comprises a generalized illustration of the programmable switch in operation.

Referring to FIG. 22, the normal operation of the programmable switch 30 is illustrated. The switch 30 is operable to sense position of a sensed element 80 relative to the housing 32 based on movement of the element 80 engaging the plunger 48. The switch 30 is connected via customer system wiring 82 to some remote indicator, control system or the like which provides power to the switch 30 and is connected to one or more of the output channels according to the particular application. If only a single channel is used, then connections to only a single output are required. If all four channels are used, then connections to all four outputs must be provided.

In the illustrated embodiment of the invention, the LVDT comprises a linear transducer. The invention is not limited to such linear position sensing. For example, the sensor could be a rotary LVDT sensing angular position of a sensed element. One example of an application for a rotary programmable switch is the landing gear of an aircraft. The multiple channels can be programmed to sense when the landing gear is up, the landing gear is down, or the landing gear is in transition. Further, the switch might be used as a pressure sensor with the sensor comprising a pressure sensor such as a piezo electric transducer. In an application such as a proximity sensor, a sensor can be an optical or sonic beam transducer or the like, as necessary. The invention is not intended to be limited to any particular type of sensor, but rather the ability to readily program the switch and, more particularly, to program multiple output channels so that a single switch can replace up to four separate switches.

Figure 23:
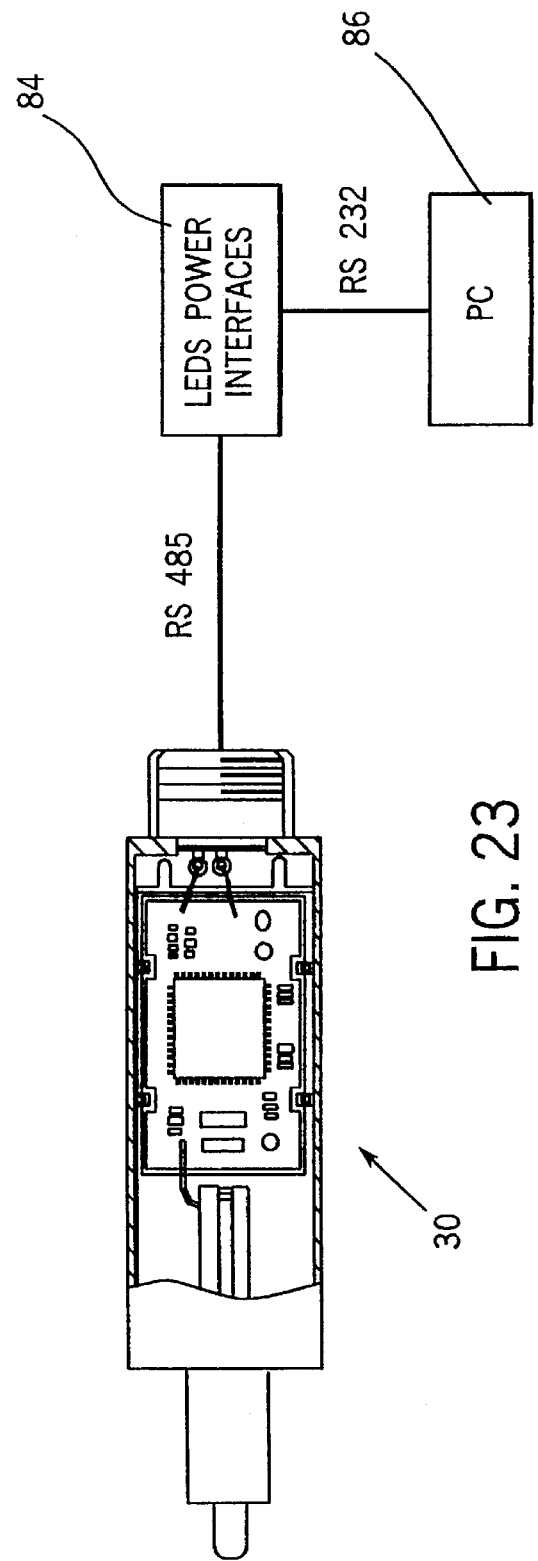
FIG. 23 is a generalized diagram of the programmable switch during a monitoring and setup mode.

FIG. 23 illustrates a setup configuration for demonstrating or programming the switch 30. The switch 30 is connected via an interface 84 including LED indicators for the output channels, power for the switch, and an interface between the RS485 interface of the switch 30 and an RS232 interface from a personal computer 86. In the illustrated embodiment of the invention, the personal computer 86 utilizes a Windows-based operating system and includes a program, referred to herein as Intelliswitch, for programming the switch 30 via the interface 84.

Figure 24:
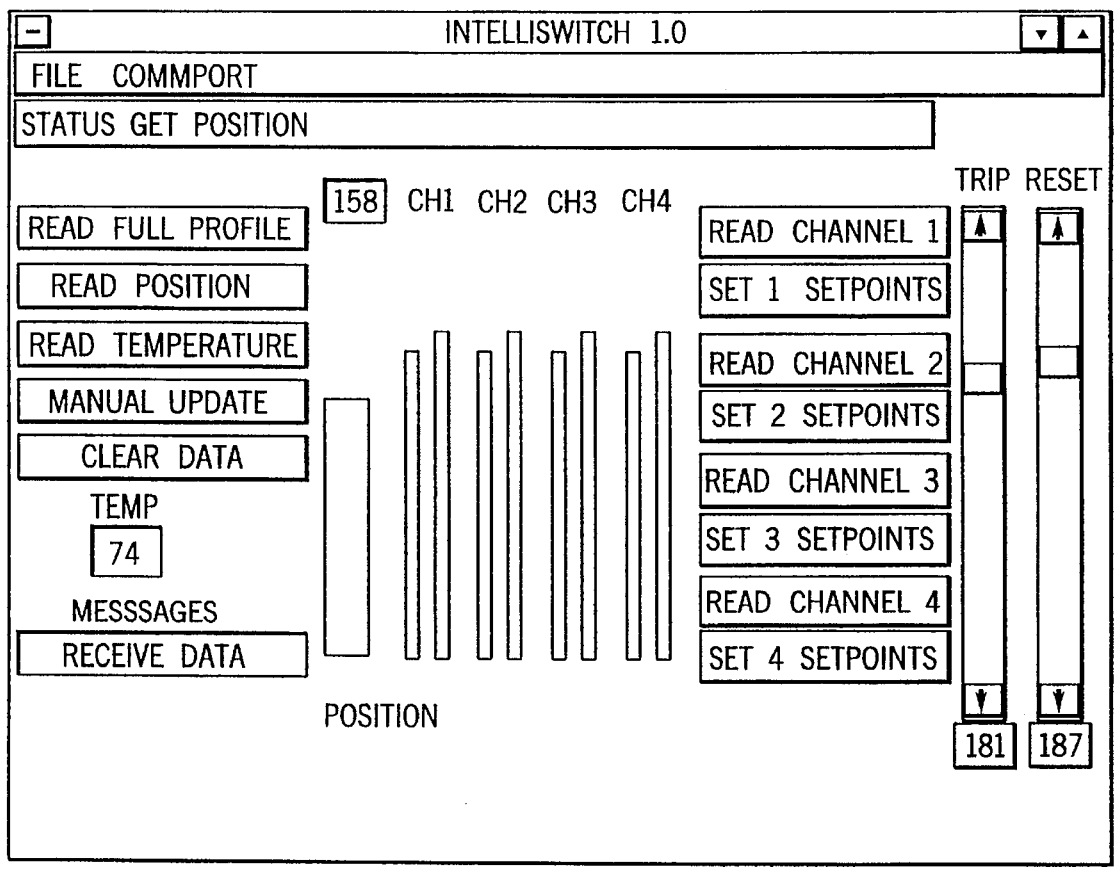
FIG. 24 illustrates a display screen for the program of FIGS. 8A–8D.

Referring to FIGS. 8A–8D, a flow diagram illustrates operation of the Intelliswitch program. This program begins at a block 200 representing a power on or reset routine for a conventional personal computer. A Microsoft Windows program is then started at a block 202 from which the Intelliswitch program is started at a block 204. The Intelliswitch program is a basic Windows operating program using basic Windows techniques for selecting commands, displaying a display in an open window or in an icon, as is well known. The flow diagram of FIGS. 8A–8D is intended to illustrate the various routines that can be selected when the Intelliswitch program is running. FIG. 24 illustrates a display shown on the personal computer 86 for programming or monitoring the switch 30.

With the program running, a decision block 206 determines if there are any program events to process based on a user selecting a program icon in the usual manner for Windows type programs. If not, then a decision block 208 determines if there is currently an open port. If not, then the program proceeds to a block 210 to process any other Windows events. If a port is open, then a decision block 212 determines if there is any data from the port to be read. If so, then a RECEIVE DATA routine, described below, is called at a block 214.

Figure 9:
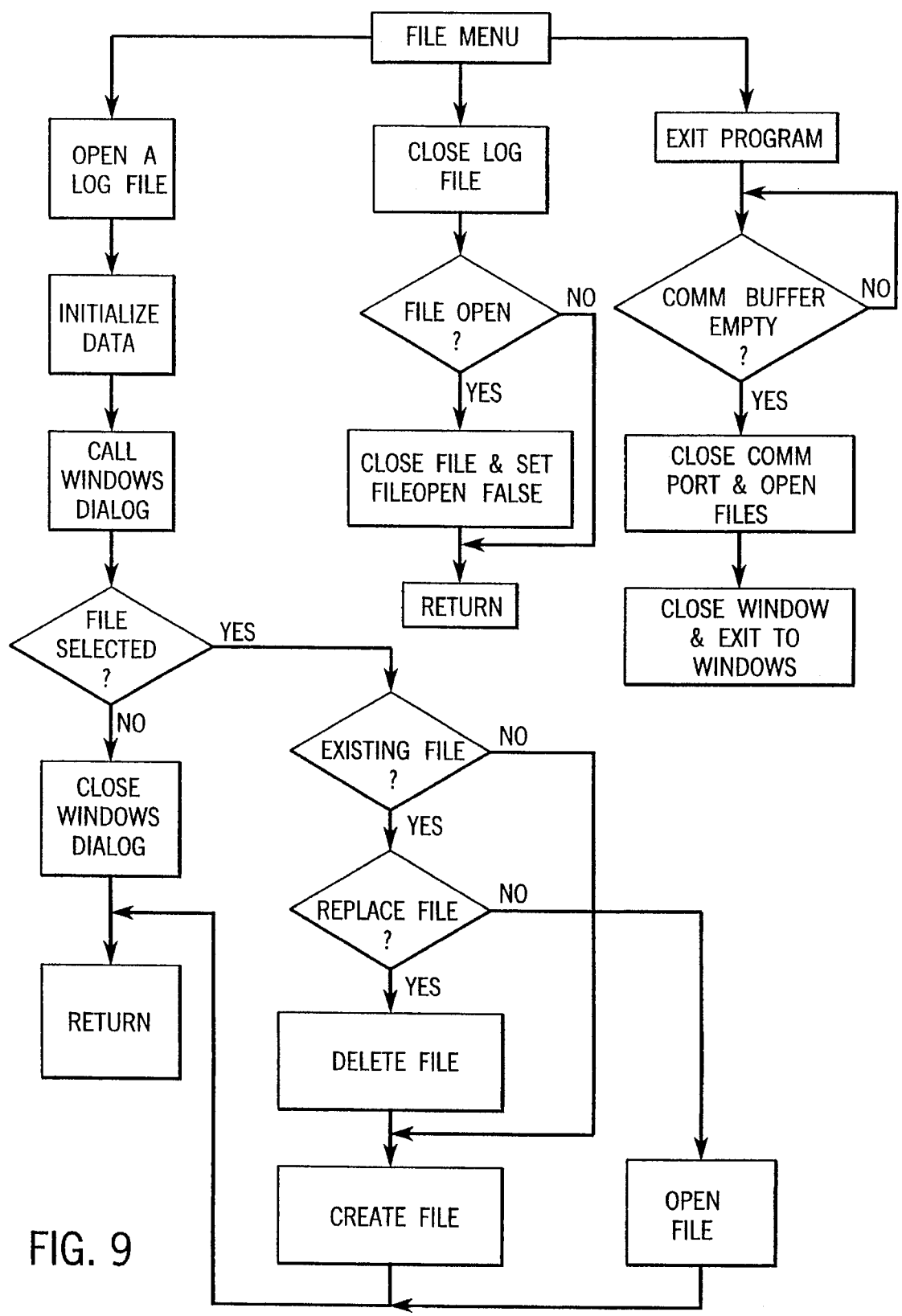
FIG. 9 comprises a flow diagram of a FILE MENU routine of FIG. 8A.
Figure 10:
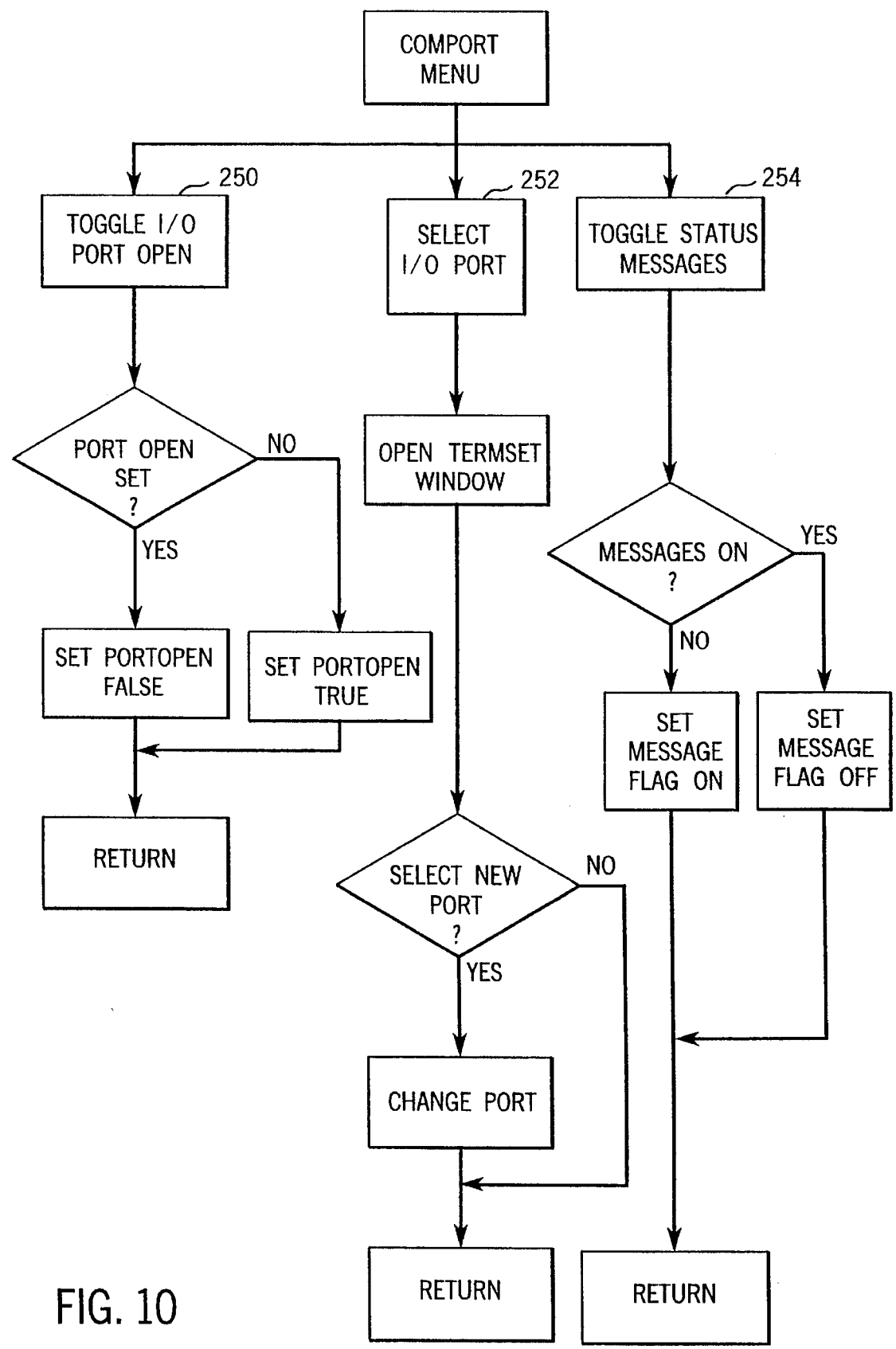
FIG. 10 is a flow diagram of a COM PORT menu routine from FIG. 8A.
Figure 11:
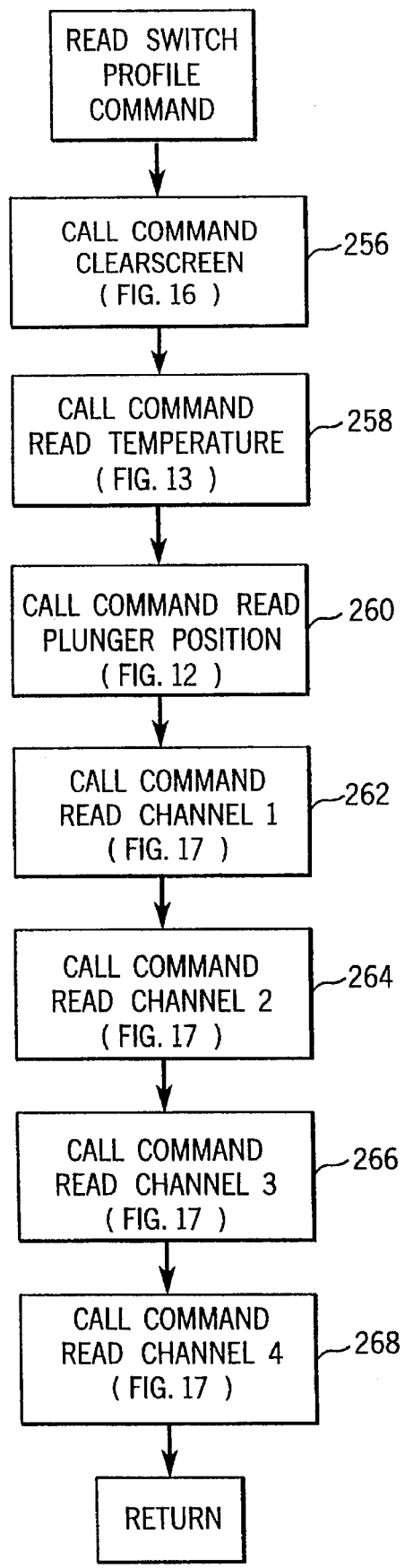
FIG. 11 is a flow diagram of a READ SWITCH PROFILE command routine of FIG. 8A.
Figure 12:
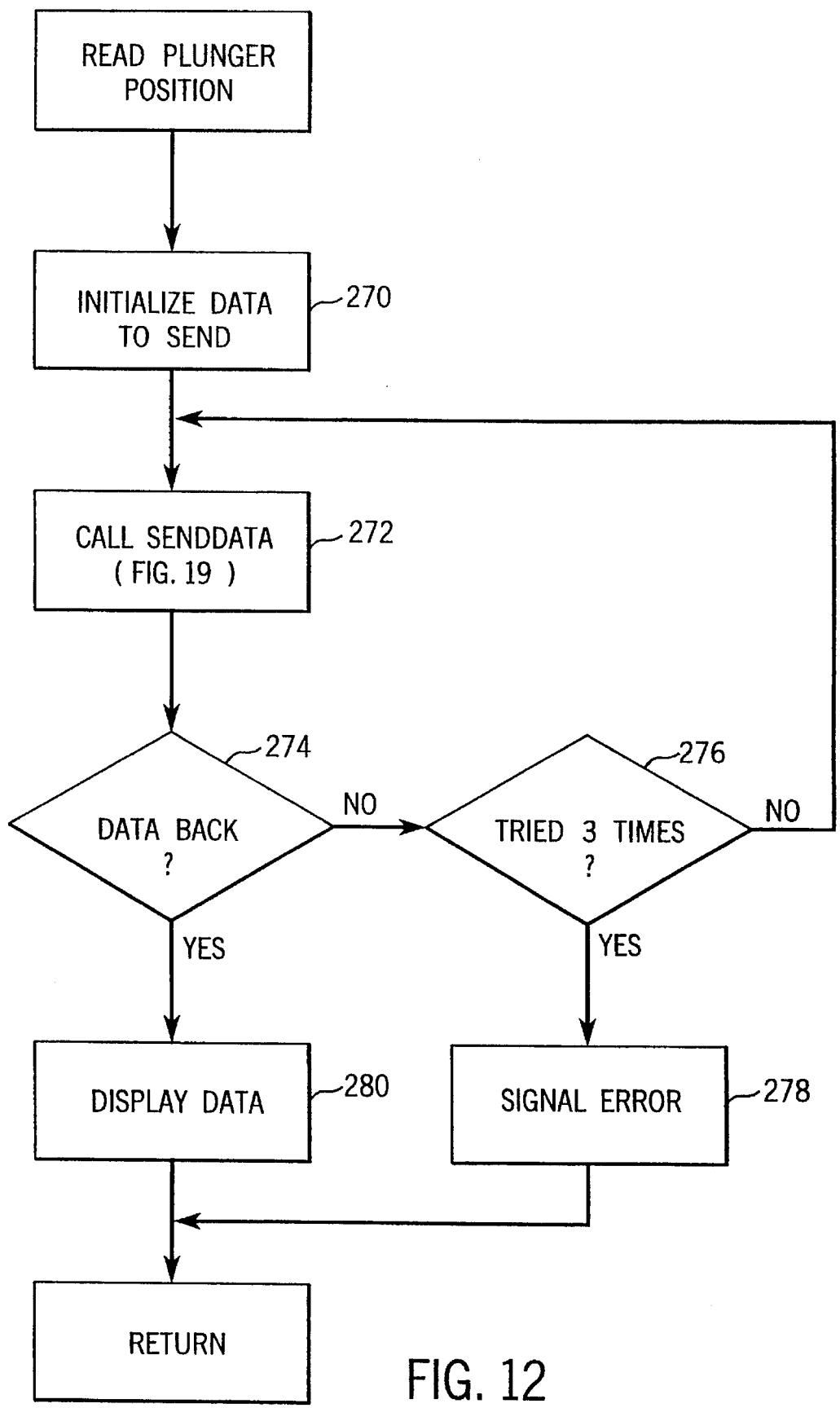
FIG. 12 is a flow diagram of a READ PLUNGER POSITION routine of FIG. 8A.
Figure 13:
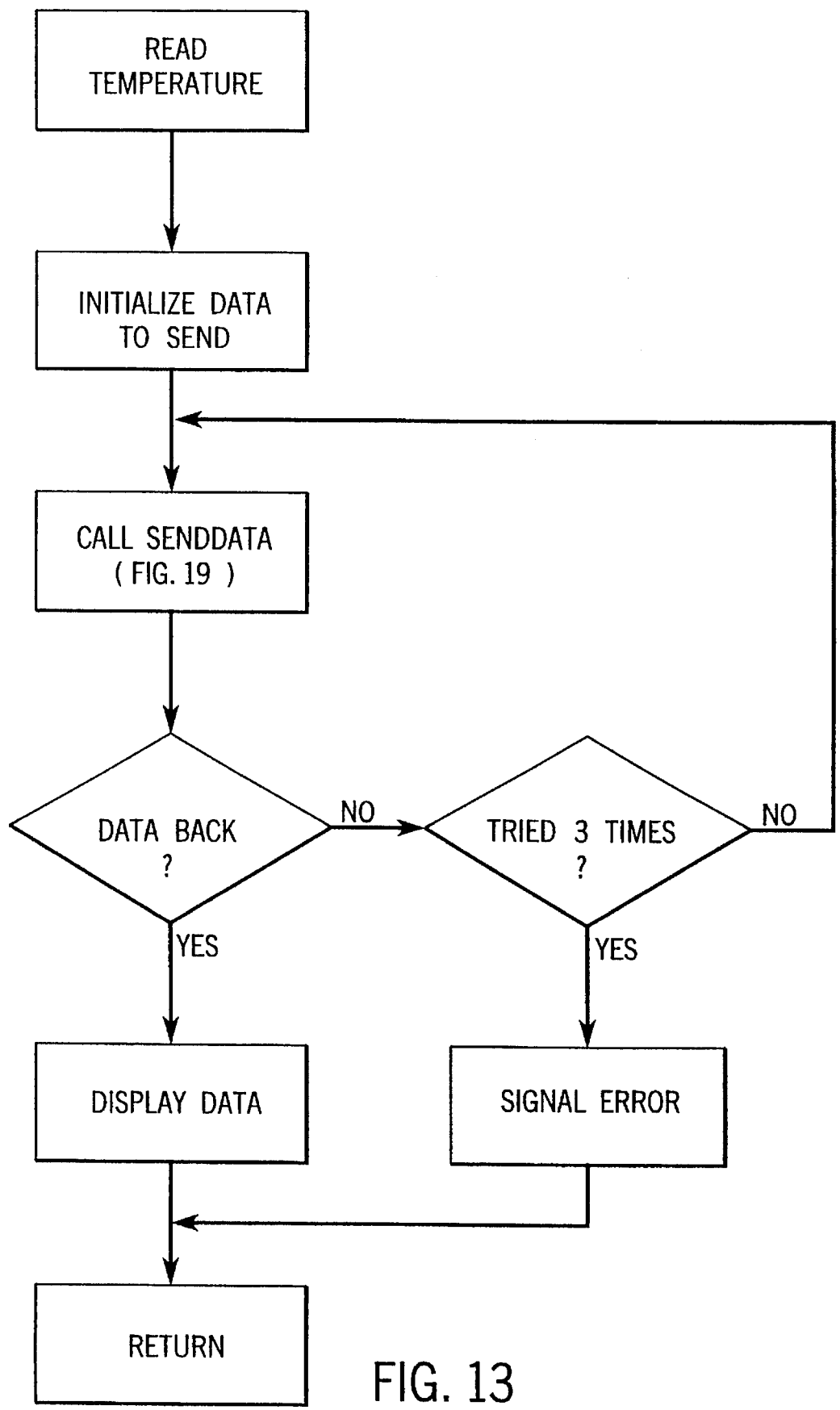
FIG. 13 is a flow diagram of a READ TEMPERATURE routine of FIG. 8B.
Figure 14:
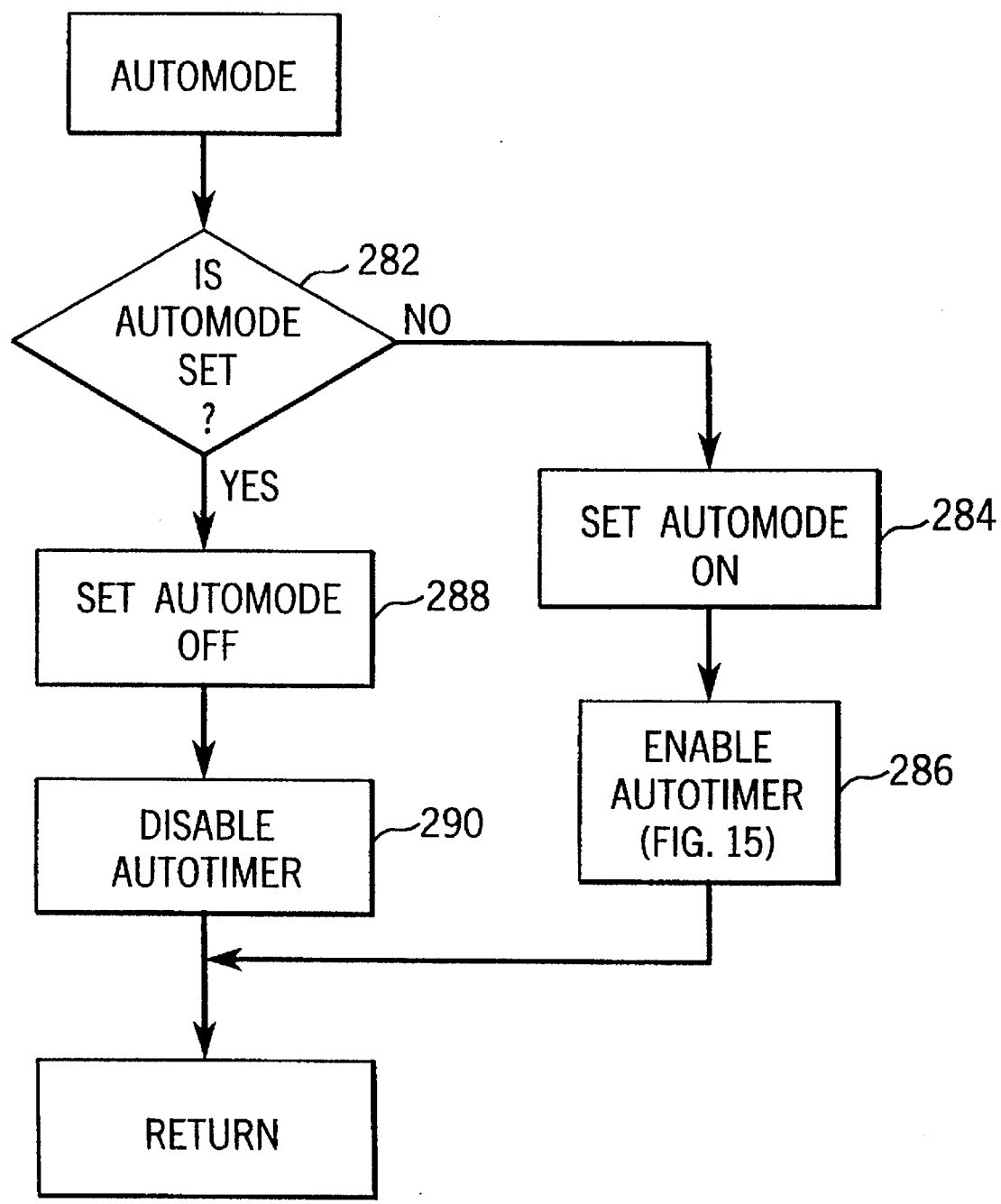
FIG. 14 is a flow diagram of a TOGGLE AUTO MODE routine of FIG. 8B.
Figure 16:
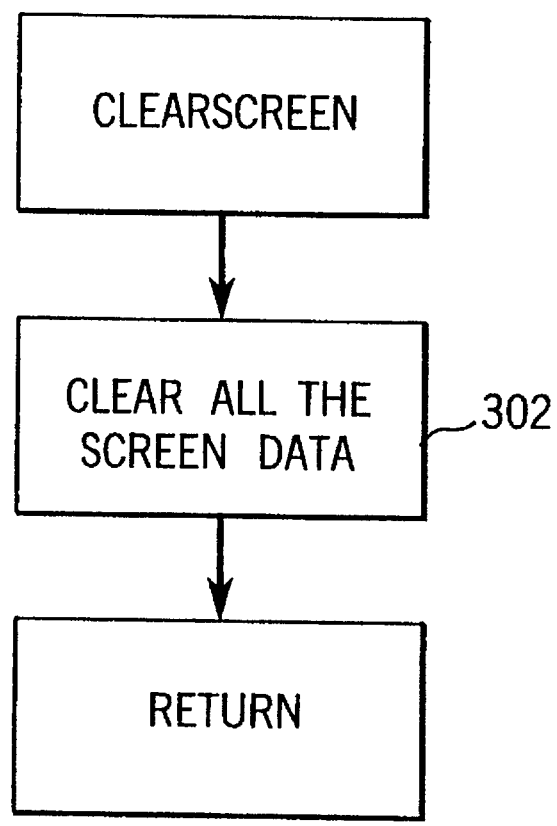
FIG. 16 is a flow diagram of a CLEAR SCREEN routine of FIG. 8B.
Figure 17:
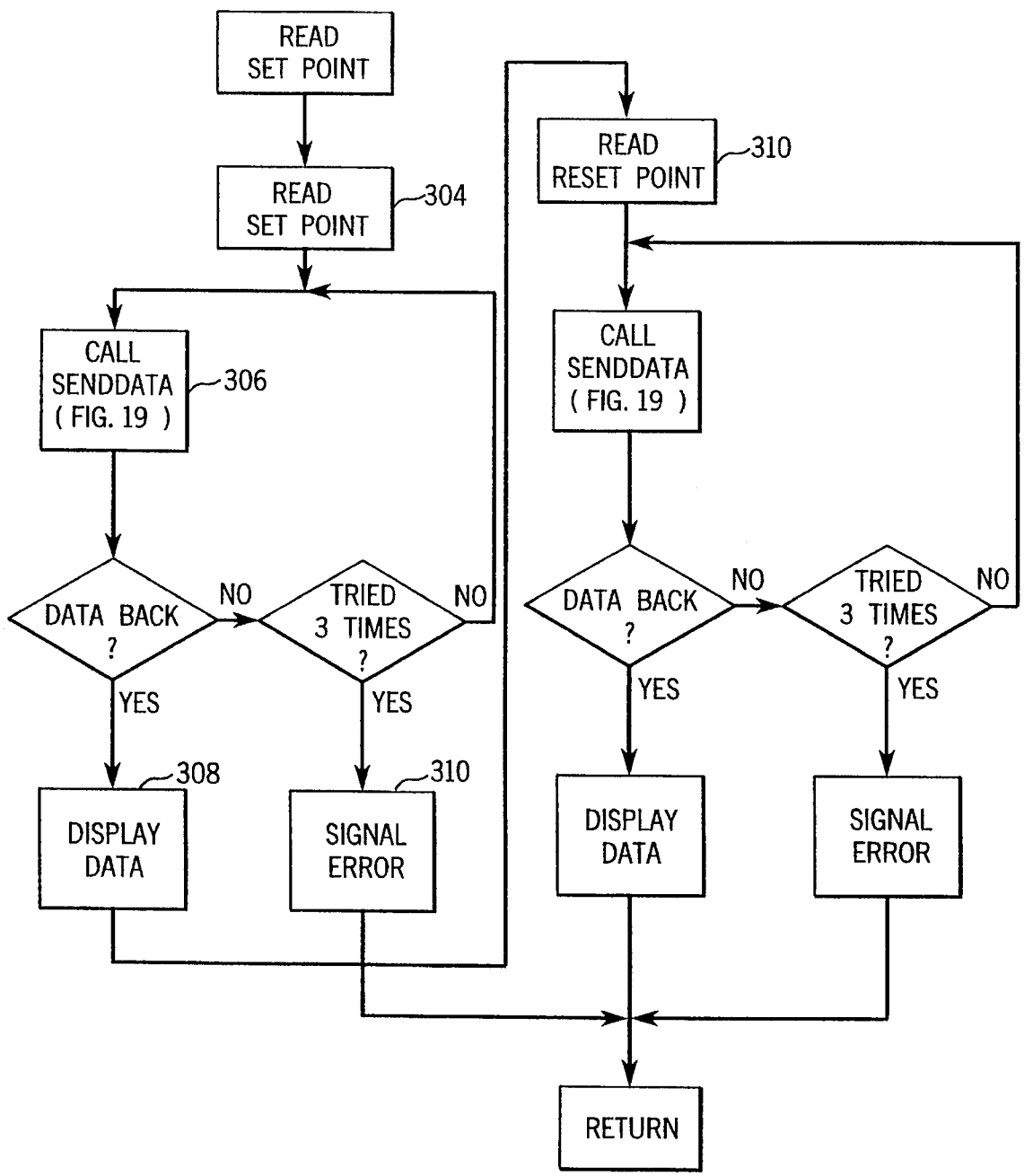
FIG. 17 is a flow diagram of a READ SET POINT routine of FIGS. 8B, 8C and 8D.
Figure 18:
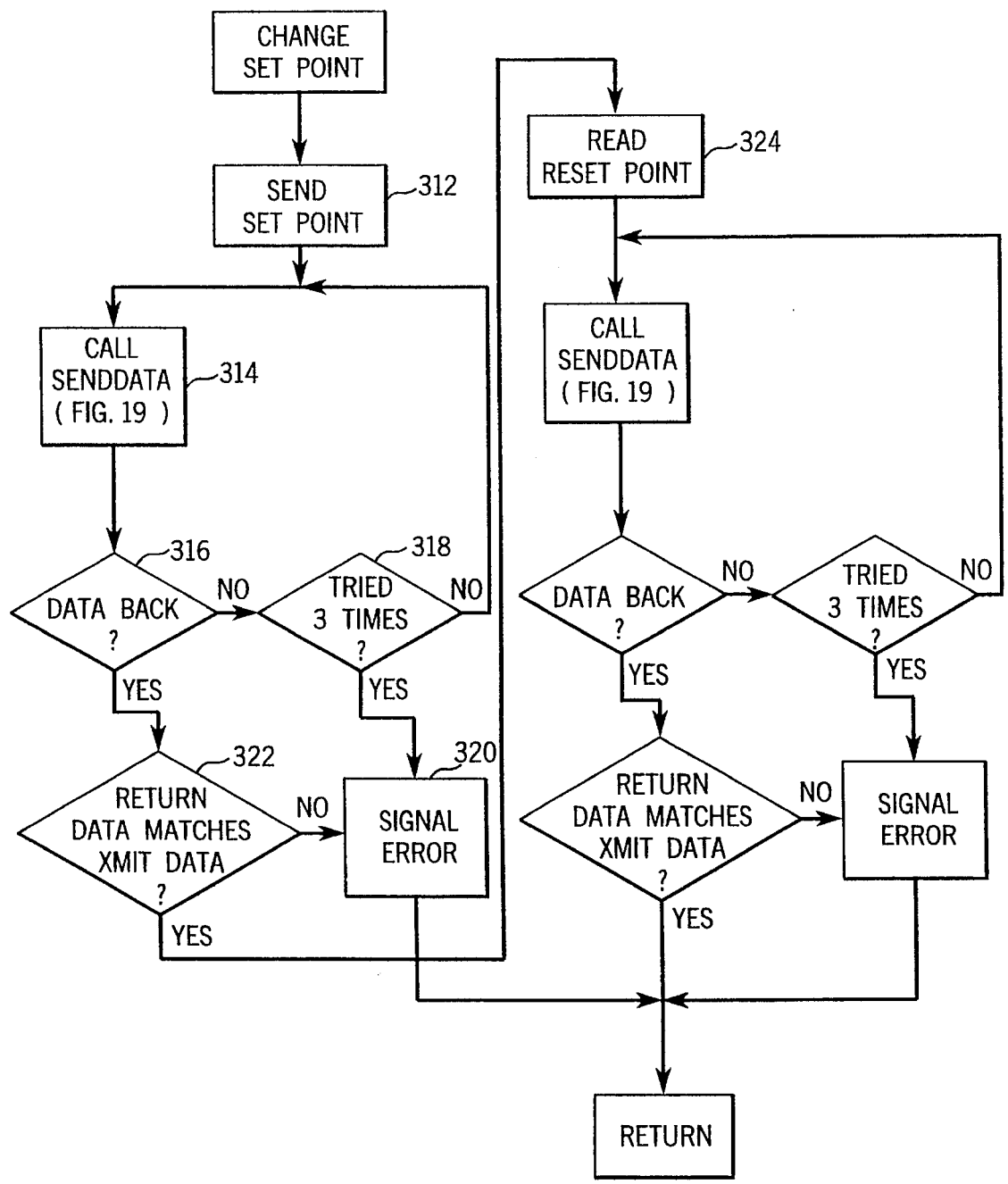
FIG. 18 is a flow diagram of a CHANGE SET POINT routine of FIGS. 8C and 8D.

Returning to the decision block 206, a program event is to be processed when a user selects a program from the open window for the switch program. Each of the program events are indicated across the bottom row of FIGS. 8A–8D. The routine implemented by each event is fully described in a separate flow diagram. The following table identifies the available event, the block number, and the figure showing the flow diagram for the particular block:

| Event | Block Number | Flow Diagram |
| --- | --- | --- |
| File Menu | 216 | FIG. 9 |
| ComPort Menu | 218 | FIG. 10 |
| Read Switch Profile | 220 | FIG. 11 |
| Read Plunger Position | 222 | FIG. 12 |
| Read Temperature | 224 | FIG. 13 |
| Toggle AutoMode | 226 | FIG. 14 |
| Clear Screen Data | 228 | FIG. 16 |
| Read Ch 1 Set Points | 230 | FIG. 17 |
| Change Ch 1 Set Points | 234 | FIG. 18 |
| Read Ch 2 Set Points | 236 | FIG. 17 |
| Change Ch 2 Set Points | 238 | FIG. 18 |
| Read Ch 3 Set Points | 240 | FIG. 17 |
| Change Ch 3 Set Points | 242 | FIG. 18 |
| Read Ch 4 Set Points | 244 | FIG. 17 |
| Set Ch 4 Set Points | 246 | FIG. 18 |

Referring to FIG. 9, a flow diagram of the FILE MENU routine selected at the block 216 of FIG. 8A is illustrated. The FILE MENU routine is a basic Windows routine for performing file related functions for a log file for storing data for a particular switch. Because the file menu routine is a conventional Windows-type routine, it is not described in detail herein and reference may be had to the flow diagram.

FIG. 10 illustrates the COMPORT MENU routine called at the block 218 of FIG. 8A. Within the COMPORT MENU a user can select from the a TOGGLE I/O PORT OPEN routine at a block 250, SELECT I/O PORT at a block 252, or TOGGLE STATUS MESSAGE at a block 254. These options again relate to the personal computer itself and the presentation screen. The TOGGLE I/O PORT OPEN routine at the block 252 opens the computer port on the PC. It allows the communication port on the PC to interrupt the program. The SELECT I/O PORT ROUTINE at the block 252 determines which ComPort on the PC is used for communications. The TOGGLE STATUS MESSAGE routine at the block 254 determines what is presented on the status message line on the PC screen.

FIG. 11 illustrates the READ SWITCH PROFILE command called at the block 220 of FIG. 8A. This command is used to update all of the various parameters shown on the display of FIG. 24. In the illustrated display, the plunger position is shown with a bar graph as well as a numerical value. The on and off values, i.e., the set and reset points for each of the four channels are represented by bar graphs. The temperature value is represented by a numerical value. The status of the plunger position relative to the set point can be indicated by color and/or appearance of the set point bar graph or otherwise. The particular display illustrated is by of example only, as numerous possibilities exist for representing the various parameters.

The switch profile command routine begins at a block 256 which calls a CLEAR SCREEN command at a block 256. This is discussed below relative to FIG. 16 and is operable to clear the parameters shown on the display. A READ TEMPERATURE command is called at a block 258. This routine is described below relative to FIG. 13 and is used to update the sensed temperature value. The READ PLUNGER POSITION is called at a block 260. This routine is discussed below relative to FIG. 12 and is used to update the plunger position value. Subsequently, blocks 262, 264, 266 and 268 are used to call READ CHANNEL commands for each of the four channels. Each is done using the routine of FIG. 17, discussed below, for reading the set and reset points for each of the four channels. The routine then ends.

With reference to FIG. 12, the READ PLUNGER POSITION routine, called at the block 222 of FIG. 8A or the block 260 of FIG. 11, is illustrated. This routine begins at a block 270 which initializes data to send to the switch. This data comprises the address of the particular switch as well as the appropriate command for reading plunger position. The data is sent by calling a SEND DATA routine, illustrated in FIG. 19, at a block 272. A decision block 274 determines if data has been received back. If not, then a decision block 276 determines if the command has been sent three times. If not, then control loops back to the block 272. If the command has been sent three times, then a signal error is given at a block 278. Once data is received back, as determined at the decision 274, then the received data is displayed at a block 280. From either block 278 or 280 the routine ends.

Figure 8B:
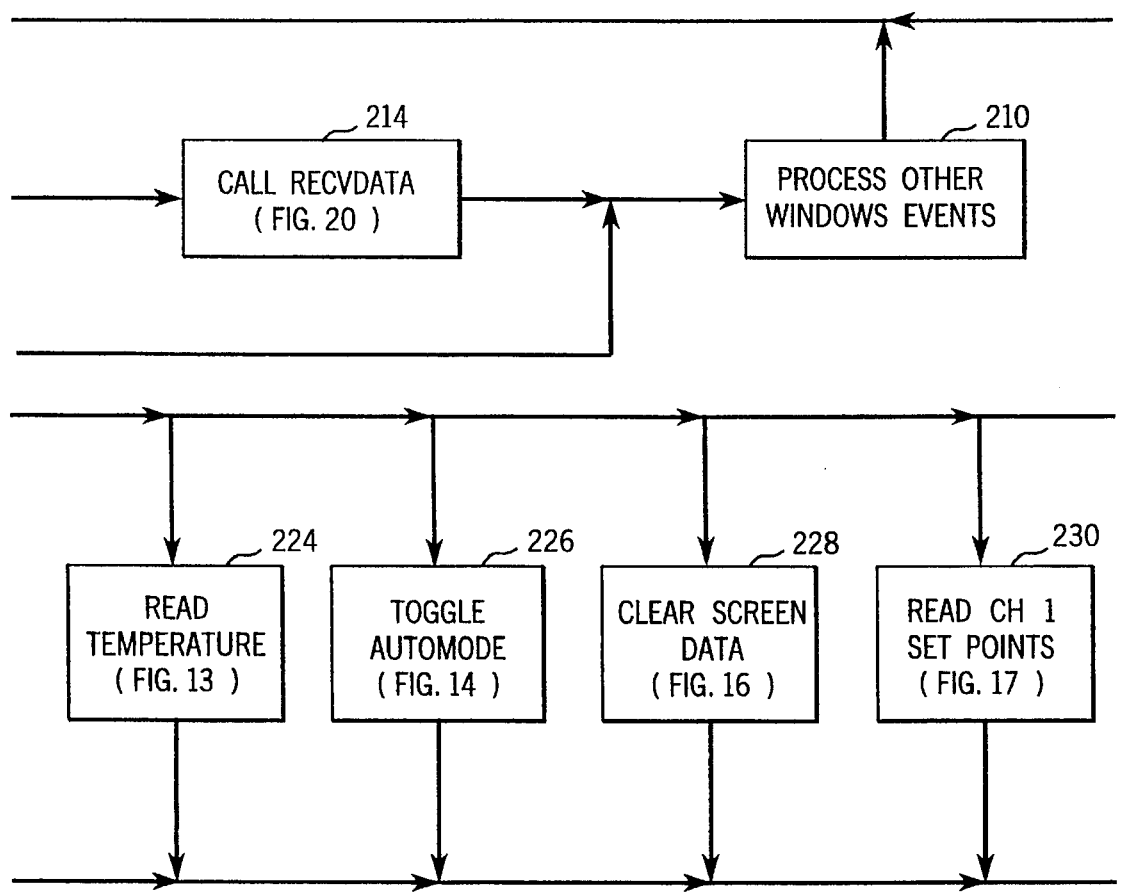
Figure 8C:
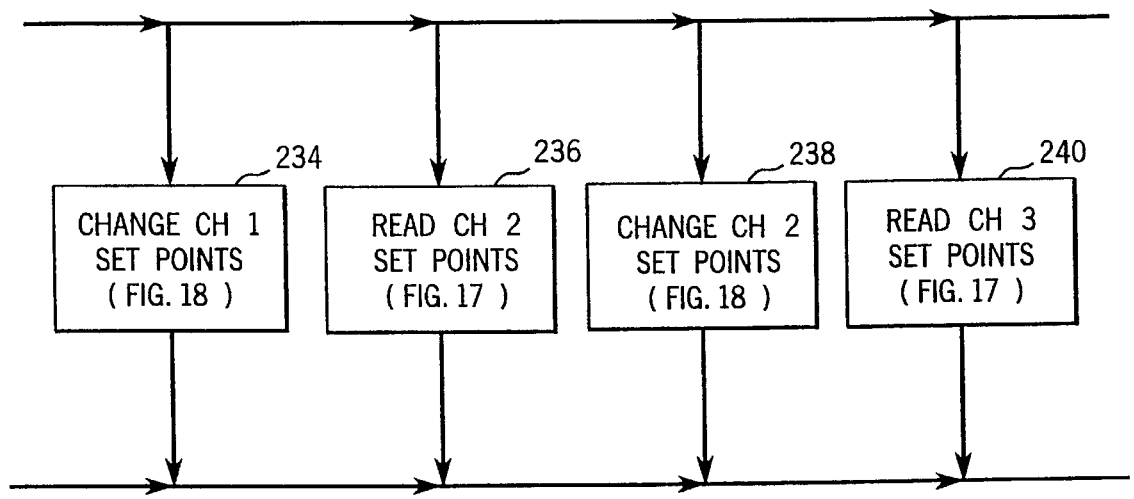
Figure 8D:
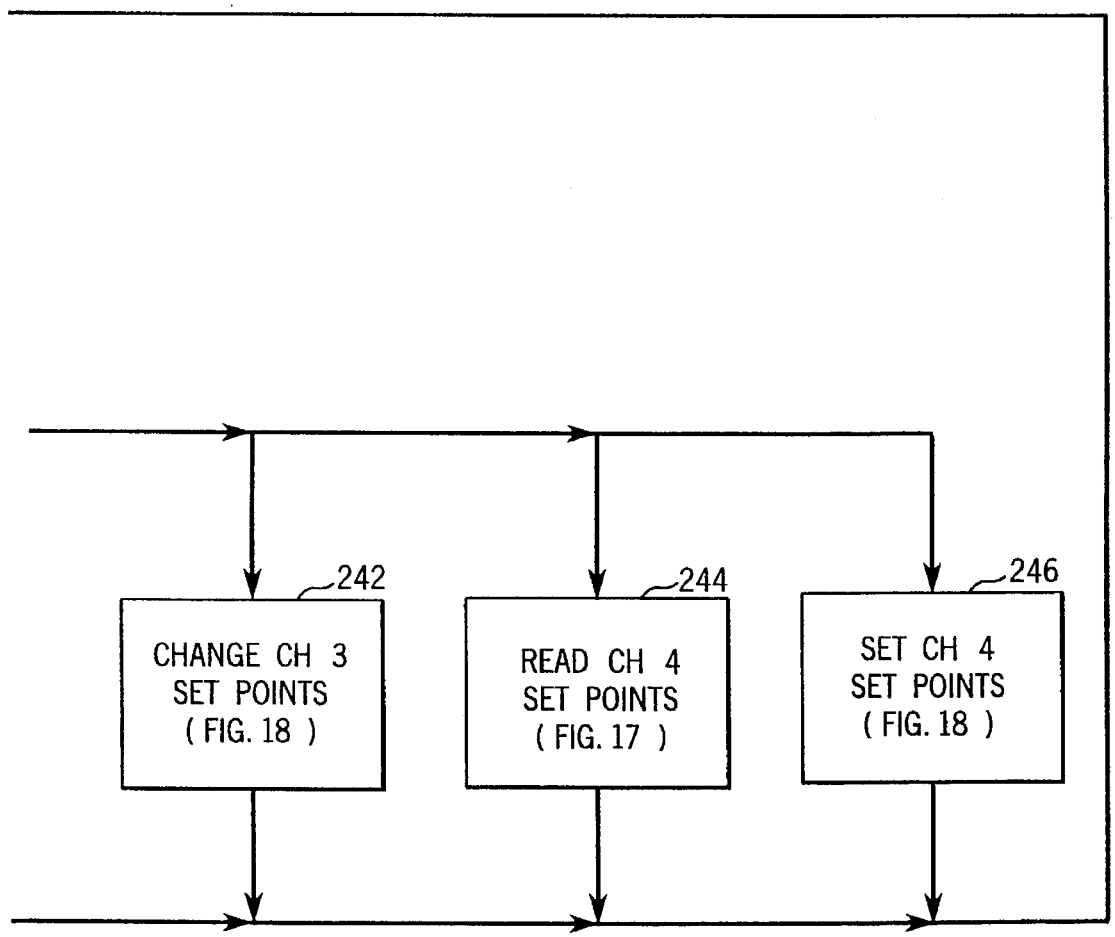

With reference to FIG. 13, the READ TEMPERATURE routine called at the block 224 of FIG. 8B or the block 258 of FIG. 11 is illustrated. This routine is essentially identical to the READ PLUNGER POSITION routine of FIG. 12, except that the data to send comprises the command to read temperature. The routine is therefore not discussed further.

Referring to FIG. 14, the AUTO MODE routine selected at the block 226 of FIG. 8B is illustrated. The auto mode is used to automatically update the plunger position periodically. A decision block 282 determines if the auto mode is set. If not, then the auto mode is set on at a block 284 and an auto timer is enabled at a block 286 and the routine then ends. If the auto mode is already set, as determined at the decision block 282, then the auto mode is set off at a block 288 and the auto timer is disabled at a block 290 and the routine ends.

Figure 15:
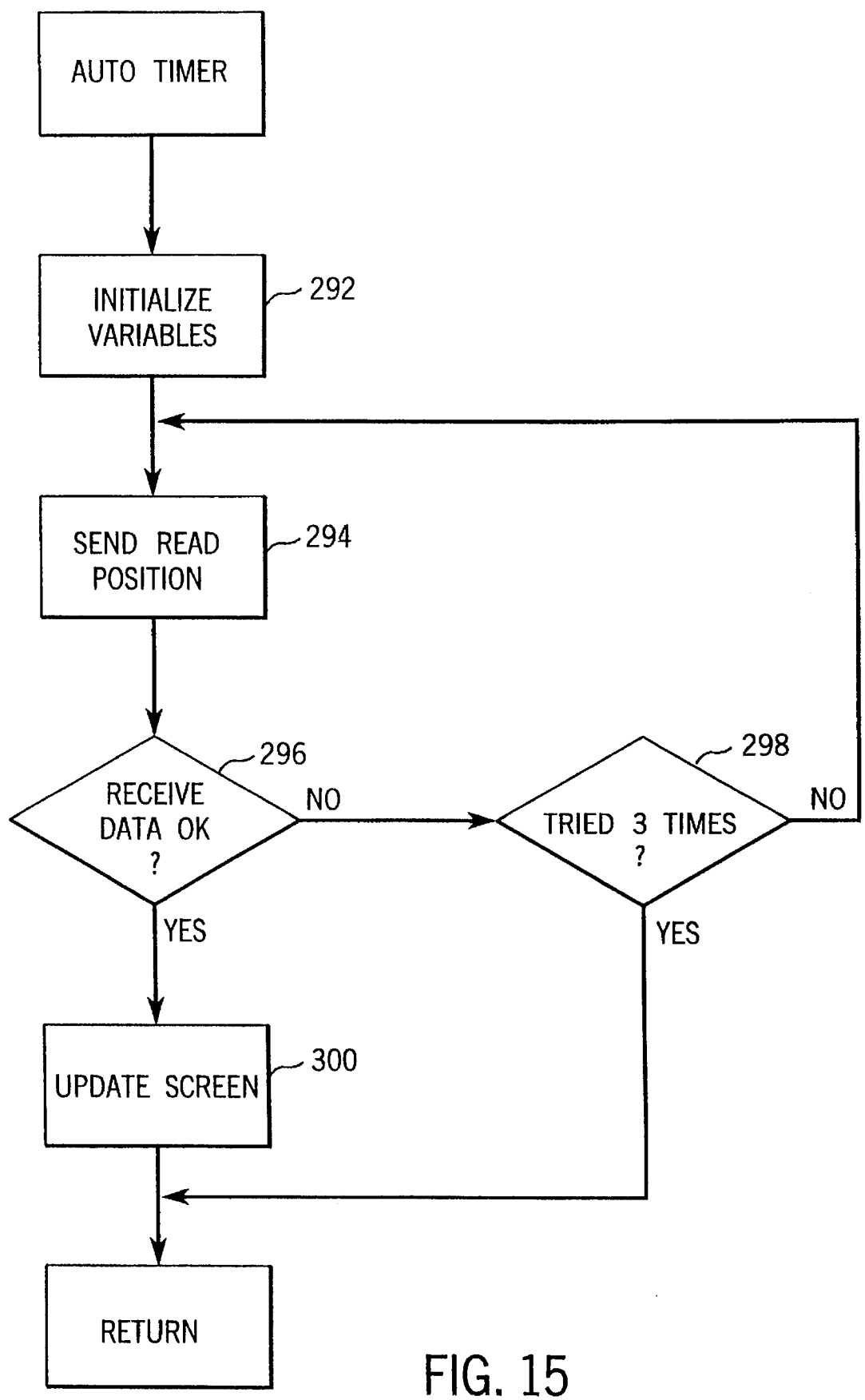
FIG. 15 is a flow diagram of an AUTO TIMER routine of FIG. 14.

When the auto timer is enabled, the auto timer program continually operates independently to periodically update the plunger position value. The routine to automatically update the plunger position is illustrated in FIG. 15. This program begins at a block 292 which initializes variables, such as the switch address or the like, and a READ POSITION command is sent to the switch at a block 294. A decision block 296 determines if data has been received OK. If not, then a decision block 298 determines if three tries have been attempted. If not, control returns to the decision block 294 to send the READ POSITION command again. If the data is received OK, then the screen is updated at a block 300 and the routine ends. After three tries, the routine also ends without updating the screen.

With reference to FIG. 16, a block diagram illustrates the clear screen routine called at the block 228 of FIG. 16 or the block 256 of FIG. 11. This routine operates simply to clear all the screen data at a block 302 and the routine then ends.

With reference to FIG. 17, the READ SET POINT routine is illustrated. This routine is used anytime it is desired to read the reference values of any one of the particular channels. The routine initially is used to read the set point at a block 304. The program then calls the SEND DATA routine of FIG. 19 at a block 306. Within the SEND DATA routine the particular channel will be identified, as well as the on point for the switch. The program then waits, as discussed with respect to the other read routines, until the data is returned and displayed at a block 308 or a signal error is indicated at a block 310. If the data is received back, then the program proceeds to read the reset point at a block 312 using a similar routine. This represents the off point for the particular channel.

FIG. 18 illustrates a flow diagram for the command to change the set point. This begins initially at the block 312. The set point and the reset point are selected either by entering numbers using the keyboard or using the mouse to vary the slide components in the display of FIG. 24. The set point is then sent by initially calling the SEND DATA routine at a block 314. A decision block 316 waits until the data is echoed back at a block 316. If not, then a decision block 318 waits to see if the data has been sent three times. If not, then the program moves back to the block 314. If so, then a signal error is indicated at a block 320. If the data is returned back, at the decision block 316, then a decision block 322 verifies that the return data matches the transmitted data. If not, then an error is signalled at the block 320. If so, then control proceeds to a block 324 to send the reset point. The routine for sending the reset point is similar to that for the set point, and is therefore not described in detail.

Figure 19:
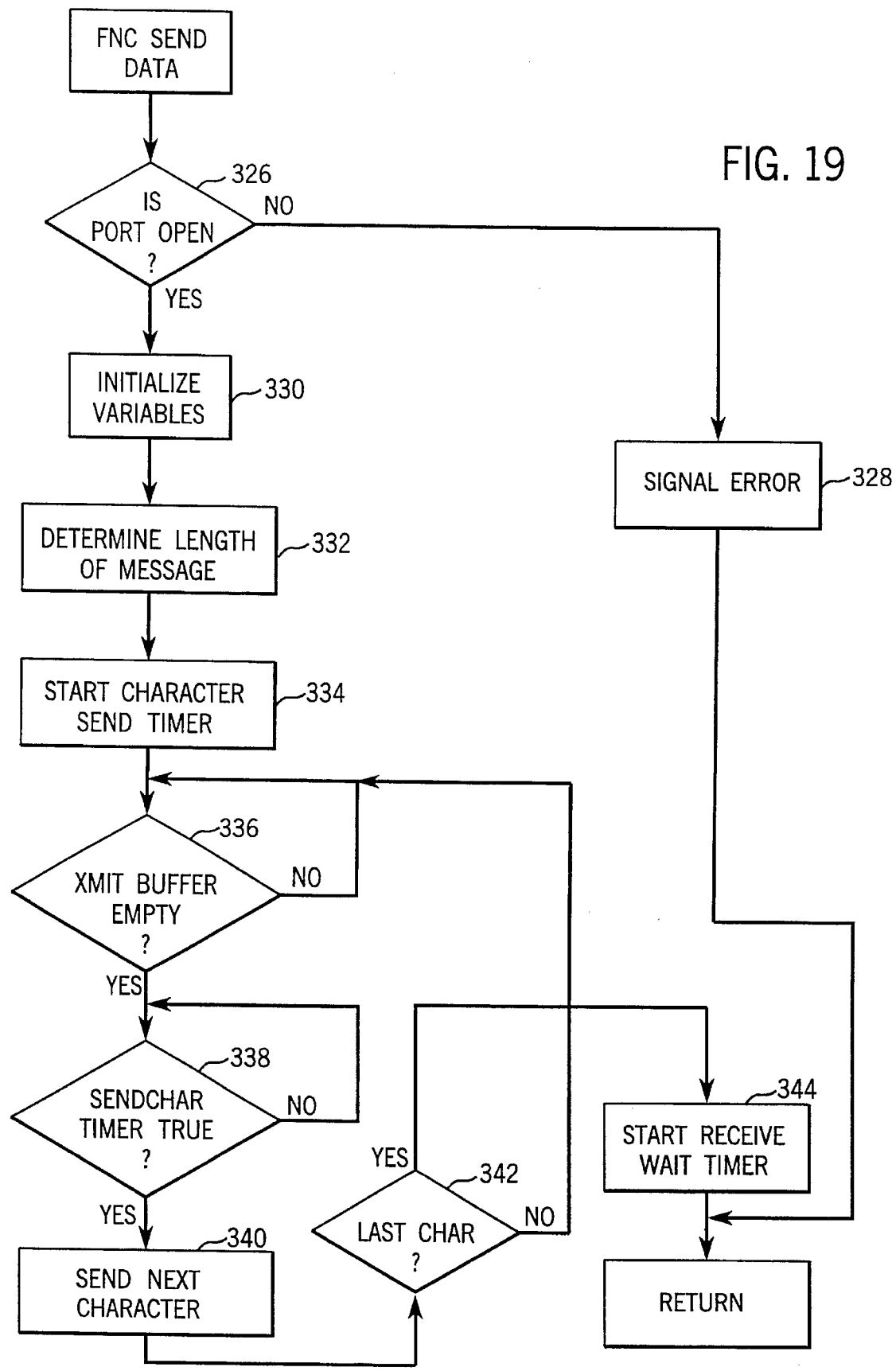
FIG. 19 is a flow diagram of a SEND DATA routine of FIGS. 17 and 18.

Referring to FIG. 19, a flow diagram illustrates the routine to send data out the I/O port to a switch. A decision block 326 determines if a port has been opened. This is done at the block 208 of the FIG. 8A. If not, then an error is signalled at a block 328 and the routine ends. If a port is open, then variables for the data to be sent are initialized at a block 330. A block 332 determines the length of message to be sent. A character send timer is started at a block 334. A decision block 336 determines if a transmit buffer is empty and loops on itself until the buffer is empty. A decision block 338 then loops on itself until the send character timer is through. The next character is sent at a block 340. A decision block 342 determines if the character is the last character. If not, then control returns to the block 336. If so, then a block 344 starts a receive wait timer and the routine ends.

Figure 20:
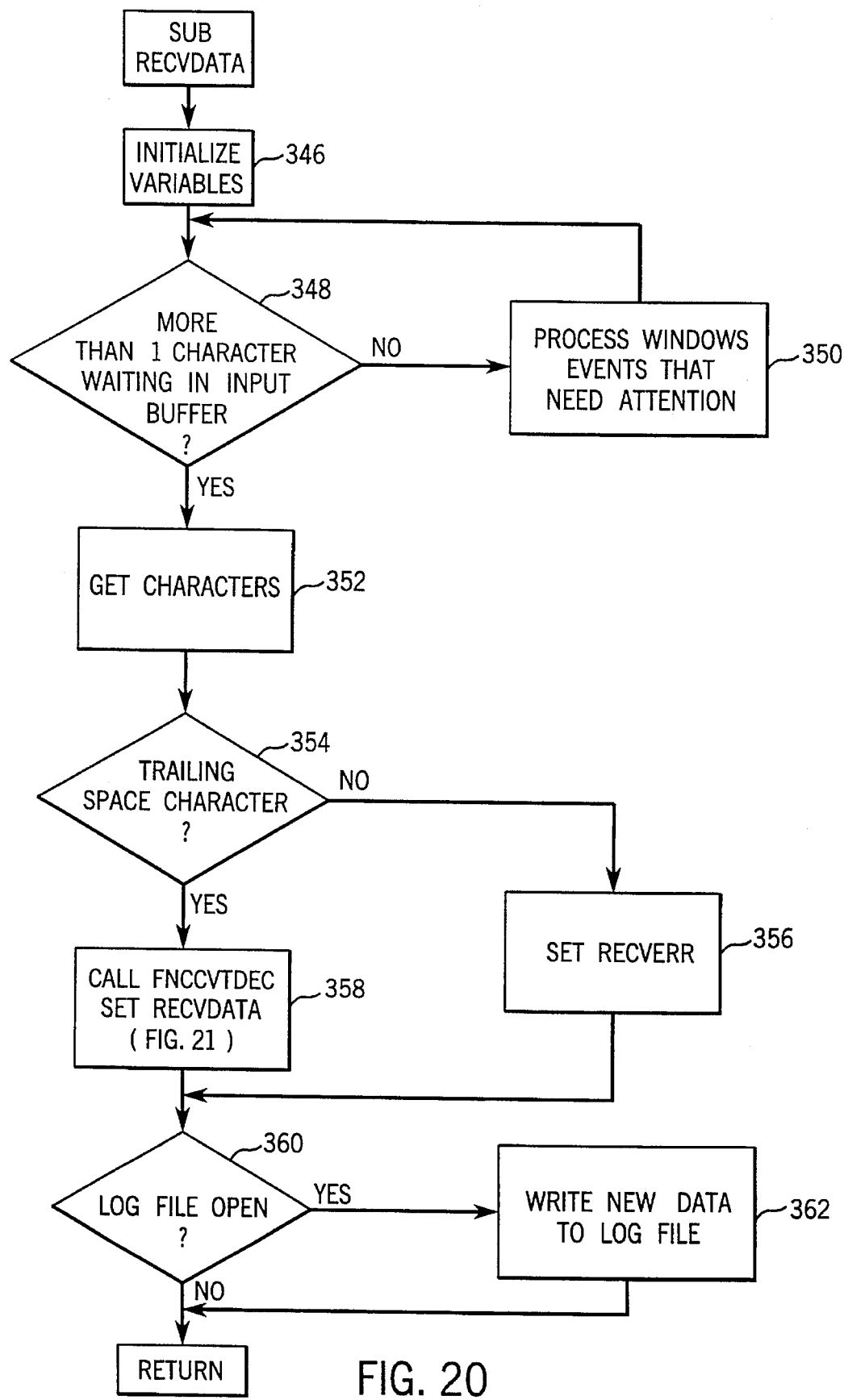
FIG. 20 is a flow diagram of a RECEIVE DATA routine of FIG. 8B.

With reference to FIG. 20, a flow diagram illustrates the routine to receive data from the switch via the I/O port. A block 346 initializes variables for the data to be received. A decision block 348 determines if there is more than one character waiting in the input buffer. If not, then any Windows events that need attention are processed at a block 350. Thus, the block 348 waits until there is more than one character waiting in the input buffer. At that time any characters are read at a block 352. A decision block 354 determines if a trailing space character is received. If not, then a receive error is set at a block 356. If so, then a routine is called at a block 358, illustrated in FIG. 21, to convert a received value from hexadecimal to decimal. A decision block 360 determines if a log file is open. If so, then the new data is written to the log file at a block 362. The routine then ends.

Figure 21:
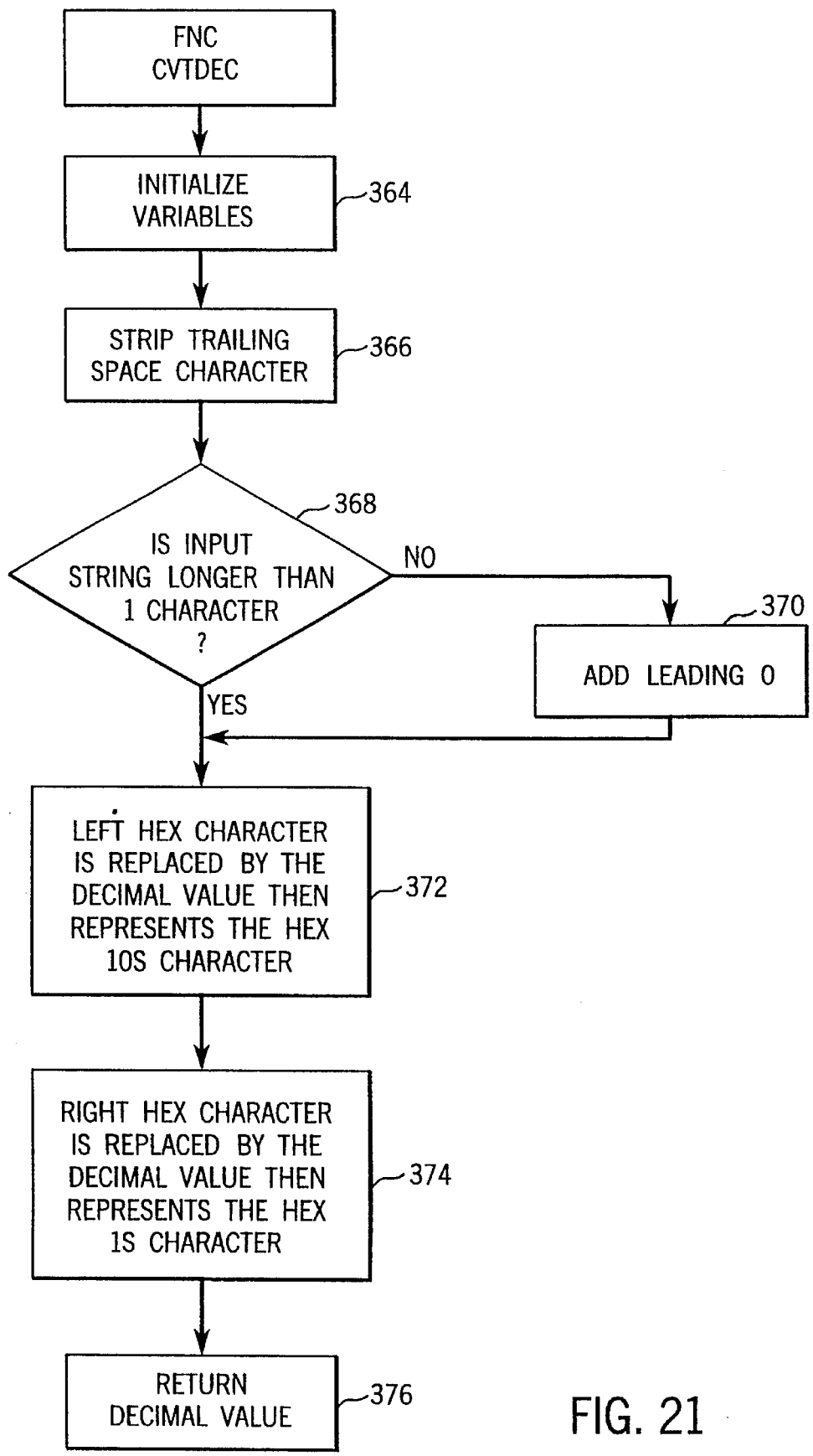
FIG. 21 is a flow diagram of a CONVERT DECIMAL routine of FIG. 20.

With reference to FIG. 21, a flow diagram illustrates the routine to convert the received hexadecimal value to a decimal. This routine begins at a block 364 which initializes variables for the routine. A trailing space character is stripped from the received value at a block 366. A decision block 368 determines if the input string is longer than one character. If not, then a leading zero is added at a block 370. A block 372 then replaces the left hex character by the decimal value that represents the hex tens character. A block 374 replaces the right hex character by the decimal value that represents the hex ones character. The decimal value is then returned at a block 376 and the routine ends.

Thus, the Intelliswitch program is used to provide feedback regarding current status of the operation of a programmable switch 30, as well as to reprogram the switch as by updating the on and off, or set and reset points, of each of up to four channels within a switch. The programming device is not required for day to day operation of the switch, but only for programming purposes. The switch 30 otherwise operates independently to provide discrete outputs based on the sensed physical property relative to stored reference values for up to four output channels. Each output channel is provided with hysteresis, if necessary.

By using a microcontroller in the switch 30 further improvements in switch operation are available. Particularly, signal averaging can be used to eliminate effects of small variations in input signal such as might be caused by vibration. Statistics can also be made based on past input signals in non-volatile memory to provide for adjustments in switching ports dependent on past sensor history. A time delay can be provided between input changes and output response. The sensed property can be linearized for non-linear operation of the sensor. Finally, corrective compensation can be provided for variables such as temperature, voltage and barometric effects.

Thus, the invention broadly comprehends the provision of a programmable switch in which a sensed physical property is compared to a stored reference value to control operation of an output switch.

We claim:

1. A programmable switch comprising:

a housing;

a sensor associated with the housing, the sensor including means for sensing a measurable physical property of a sensed element proximate the housing and developing an electrical signal varying relative thereto to represent the sensed physical property;

a logic circuit disposed in the housing and receiving the electrical signal, the logic circuit including storage means for storing a reference value and logic means for comparing the reference value to the sensed physical property to determine status of the sensed physical property;

input means operatively associated with the logic circuit for selectively changing the stored reference value to reprogram the switch; and output switch means operatively associated with the logic circuit to externally indicate status of the sensed property.

2. The programmable switch of claim 1 wherein said sensor comprises an actuator movable relative to the housing for determining position of the sensed element.

3. The programmable switch of claim 2 wherein said sensor further comprises a linear variable differential transducer (LVDT) for sensing position of the actuator.

4. The programmable switch of claim 3 wherein said sensor further comprises a signal conditioner circuit to drive the LVDT and develop the electrical signal.

5. The programmable switch of claim 1 wherein the input means comprises an interface circuit for connecting the switch to a programming device to reprogram the switch.

6. The programmable switch of claim 1 wherein said output means comprises an electronic switch controlled by the logic circuit.

7. The programmable switch of claim 1 wherein the storage means stores a plurality of reference values and the logic means compares each reference value to the sensed physical property to determine status of the sensed physical property relative to each of the reference values.

8. The programmable switch of claim 7 wherein the output switch means externally indicates status of the sensed property relative to each of the reference values.

9. The programmable switch of claim 1 wherein said stored reference value includes first and second values to provide hysteresis.

10. A programmable switch system comprising:

a housing;

a sensor associated with the housing, the sensor including means for sensing a measurable physical property of a sensed element proximate the housing and developing an electrical signal varying relaive thereto to represent the sensed physical property;

a logic circuit disposed in the housing and receiving the electrical signal, the logic circuit including storage means for storing a reference value and logic means for comparing the reference value to the sensed physical property to determine status of the sensed physical property;

input means operatively associated with the logic circuit for selectively changing the stored reference value to reprogram the switch;

output switch means operatively associated with the logic circuit to externally indicate status of the sensed property; and a programming device connectable to the input means for transferring a value to be stored in the storage meats as the reference value.

11. The programmable switch system of claim 10 wherein said sensor comprises an actuator movable relative to the housing for determining position of the sensed element.

12. The programmable switch system of claim 11 wherein said sensor further comprises a linear variable differential transducer (LVDT) for sensing position of the actuator.

13. The programmable switch system of claim 12 wherein said sensor further comprises a signal conditioner circuit to drive the LVDT and develop the electrical signal.

14. The programmable switch system of claim 10 wherein the input means comprises an interface circuit for connecting the switch to the programming device to reprogram the switch.

15. The programmable switch system of claim 10 wherein said output means comprises an electronic switch controlled by the logic circuit.

16. The programmable switch system of claim 10 wherein the storage means stores a plurality of reference values and the logic means compares each reference value to the sensed physical property to determine status of the sensed physical property relative to each of the reference values.

17. The programmable switch system of claim 16 wherein the output switch means externally indicates status of the sensed property relative to each of the reference values.

18. The programmable switch system of claim 10 wherein said stored reference value includes first and second values to provide hysteresis.

19. The programmable switch system of claim 10 wherein said input means provides bidirectional communication between the programming device and the logic circuit and the programming device includes a display for displaying the stored reference value and the sensed physical property.

* * * * *